(12) United States Patent
Kwon et al.

(10) Patent No.: US 9,806,827 B2
(45) Date of Patent: Oct. 31, 2017

(54) COMPUTING SYSTEM WITH INTERFERENCE CANCELLATION MECHANISM AND METHOD OF OPERATION THEREOF

(71) Applicant: Samsung Electronics Co., Ltd., Suwon-si, Gyeonggi-Do (KR)

(72) Inventors: Hyukjoon Kwon, San Diego, CA (US); Jungwon Lee, San Diego, CA (US); Inyup Kang, San Diego, CA (US)

(73) Assignee: Samsung Electronics Co., Ltd., Gyeonggi-Do (KR)

( * ) Notice: Subject to any disclaimer, the term of this patent is extended or adjusted under 35 U.S.C. 154(b) by 178 days.

(21) Appl. No.: 14/464,599

(22) Filed: Aug. 20, 2014

(65) Prior Publication Data

US 2015/0079918 A1   Mar. 19, 2015

Related U.S. Application Data

(60) Provisional application No. 61/877,441, filed on Sep. 13, 2013.

(51) Int. Cl.

| H04B 1/10 | (2006.01) |
|---|---|
| H04B 15/02 | (2006.01) |
| H04W 52/24 | (2009.01) |
| H04W 72/08 | (2009.01) |
| H04B 7/155 | (2006.01) |
| H04W 76/02 | (2009.01) |

(52) U.S. Cl.
CPC ......... *H04B 15/02* (2013.01); *H04B 7/15585* (2013.01); *H04W 52/243* (2013.01); *H04W 72/082* (2013.01); *H04W 76/023* (2013.01)

(58) Field of Classification Search
CPC . H04W 72/082; H04W 28/16; H04W 52/243; H04W 52/242; H04W 76/023; H04B 7/15564; H04B 7/15585; H04B 15/00
USPC .................................. 455/296, 456.1–456.5
See application file for complete search history.

(56) References Cited

U.S. PATENT DOCUMENTS

| 5,666,661 A * | 9/1997 | Grube ................... H04W 84/08 |
|---|---|---|
| | | 455/509 |
| 6,678,341 B1 * | 1/2004 | Miyake ................ H04W 88/02 |
| | | 370/338 |
| 7,333,824 B2 | 2/2008 | Zhang et al. |
| 8,107,883 B2 | 1/2012 | Peng et al. |

(Continued)

OTHER PUBLICATIONS

X.Li, B.Seet, and P.Chong, "Multihop cellular networks: Technology and economics", Computer Networks 52 (2008) 1825-1837.

(Continued)

*Primary Examiner* — Duc M Nguyen
(74) *Attorney, Agent, or Firm* — IP Investment Law Group

(57) ABSTRACT

A computing system includes: a communication unit configured to determine an interfering interface based on a device location for locating an interference-aware receiver for processing a receiver signal including an interference signal described by the interfering interface; and an inter-device interface, coupled with the communication unit, configured to communicate the interfering interface for communicating the interfering interface to the interference-aware receiver for processing the interference signal or a further instance thereof.

20 Claims, 6 Drawing Sheets

(56) References Cited

U.S. PATENT DOCUMENTS

| | | | |
|---|---|---|---|
| 8,135,379 B2 | 3/2012 | Ramachandran et al. | |
| 8,260,337 B2 | 9/2012 | Periyalwar et al. | |
| 8,305,972 B2 | 11/2012 | Baker et al. | |
| 2003/0123420 A1* | 7/2003 | Sherlock | H04W 24/00 370/338 |
| 2005/0149443 A1* | 7/2005 | Torvinen | A63F 13/12 705/51 |
| 2006/0252369 A1* | 11/2006 | Rasanen | H04B 7/18558 455/39 |
| 2006/0258382 A1* | 11/2006 | Zhang | H04W 72/082 455/501 |
| 2008/0069033 A1 | 3/2008 | Li et al. | |
| 2008/0200195 A1* | 8/2008 | Abe | H04W 16/14 455/501 |
| 2008/0279317 A1* | 11/2008 | Lee | H04B 1/1027 375/346 |
| 2008/0285477 A1* | 11/2008 | Kuroda | H04L 1/0026 370/252 |
| 2009/0221325 A1* | 9/2009 | Periyalwar | H04W 52/383 455/552.1 |
| 2009/0233544 A1* | 9/2009 | Oyman | H04B 7/15592 455/7 |
| 2010/0081396 A1* | 4/2010 | Zeira | H04B 7/0408 455/75 |
| 2010/0169498 A1 | 7/2010 | Palanki et al. | |
| 2010/0227566 A1* | 9/2010 | Kim | H04B 7/0617 455/67.13 |
| 2010/0261469 A1* | 10/2010 | Ribeiro | H04W 99/00 455/423 |
| 2010/0279672 A1 | 11/2010 | Koskela et al. | |
| 2010/0309861 A1* | 12/2010 | Gorokhov | H04B 1/7103 370/329 |
| 2011/0034204 A1* | 2/2011 | Sawai | H04W 4/02 455/522 |
| 2011/0051858 A1* | 3/2011 | Salvekar | H04B 1/7107 375/341 |
| 2011/0116480 A1* | 5/2011 | Li | H04W 28/04 370/332 |
| 2011/0124289 A1* | 5/2011 | Balachandran | H04J 11/0053 455/63.1 |
| 2011/0145397 A1* | 6/2011 | Burns | H04L 29/1249 709/224 |
| 2011/0228666 A1* | 9/2011 | Barbieri | H04W 76/023 370/216 |
| 2011/0249611 A1* | 10/2011 | Khandekar | H04B 7/155 370/315 |
| 2011/0268019 A1* | 11/2011 | Tang | H04L 1/0048 370/328 |
| 2011/0316561 A1* | 12/2011 | Tinsley | H04B 15/00 324/628 |
| 2012/0106464 A1* | 5/2012 | Ma | H04W 16/14 370/329 |
| 2012/0214524 A1* | 8/2012 | Wajcer | H04B 1/109 455/502 |
| 2012/0282922 A1* | 11/2012 | Fodor | H04W 8/22 455/426.1 |
| 2012/0309291 A1* | 12/2012 | Sawai | H04B 7/15542 455/7 |
| 2013/0078991 A1* | 3/2013 | Nam | H04B 7/024 455/423 |
| 2013/0089023 A1 | 4/2013 | Shin et al. | |
| 2013/0150058 A1 | 6/2013 | Lim et al. | |
| 2013/0150106 A1 | 6/2013 | Bucknell et al. | |
| 2013/0155967 A1 | 6/2013 | Kang et al. | |
| 2013/0156139 A1 | 6/2013 | Lee et al. | |
| 2013/0178221 A1 | 7/2013 | Jung et al. | |
| 2013/0252621 A1* | 9/2013 | Dimou | H04W 72/082 455/450 |
| 2013/0265961 A1* | 10/2013 | Van Phan | H04W 4/00 370/329 |
| 2013/0295976 A1* | 11/2013 | Patil | H04W 24/10 455/501 |
| 2013/0310068 A1* | 11/2013 | Fischer | G01S 19/05 455/456.1 |
| 2013/0344801 A1* | 12/2013 | Redana | H04W 72/082 455/9 |
| 2015/0139004 A1* | 5/2015 | Fodor | H04W 72/082 370/252 |
| 2015/0156729 A1* | 6/2015 | Sawai | H04W 16/14 455/522 |
| 2016/0249302 A1* | 8/2016 | Uchiyama | H04J 11/0056 |

OTHER PUBLICATIONS

H.Viswanathan, "Performance of Cellular Networks With Relays and Centralized Scheduling", IEEE Transactions on Wireless Communications, vol. 4, No. 5, Sep. 2005.

K.Doppler, M.Rinne, C.Wijting, C.B.Ribeiro, and K.Hugl, "Device-to-device communication as an underlay to LTE-advanced networks", IEEE Communications Magazine, vol. 47, Issue 12, pp. 42-49, 2009 http://wire.cs.nctu.edu.tw/Group_Meeting/Hank/Device-to-Device_Communication_as_an_Underlay_to_LTE-Advanced_Networks.pdf.

A.Osseiran, K.Dopper, CRibeiro, M.Xiao, M.Skoglund, and J.Manssour, "Advances in Device-to-Device Communications and Network Coding for IMT-Advanced", ICT-MobileSummit 2009 Conference Proceedings, pp. 1-8, https://research.nokia.com/files/AdvancesInD2DCommunicationsAndNetworkCoding4IMTA.pdf.

\* cited by examiner

COMPUTING SYSTEM WITH INTERFERENCE CANCELLATION MECHANISM AND METHOD OF OPERATION THEREOF

CROSS-REFERENCE TO RELATED APPLICATION(S)

This application claims the benefit of U.S. Provisional Patent Application Ser. No. 61/877,441 filed Sep. 13, 2013, and the subject matter thereof is incorporated herein by reference thereto.

TECHNICAL FIELD

An embodiment of the present invention relates generally to a computing system, and more particularly to a system with interference cancellation mechanism.

BACKGROUND

Modern consumer and industrial electronics, especially devices such as cellular phones, navigations systems, portable digital assistants, and combination devices, are providing increasing levels of functionality to support modern life including mobile communication. Research and development in the existing technologies can take a myriad of different directions.

The increasing demand for information in modern life requires users to access information at any time, at increasing data rates. However, telecommunication signals used in mobile communication effectively experience various types of interferences from numerous sources, as well as computational complexities rising from numerous possible formats for communicated information, which affect the quality and speed of the accessible data.

Thus, a need still remains for a computing system with interference cancellation mechanism. In view of the ever-increasing commercial competitive pressures, along with growing consumer expectations and the diminishing opportunities for meaningful product differentiation in the marketplace, it is increasingly critical that answers be found to these problems. Additionally, the need to reduce costs, improve efficiencies and performance, and meet competitive pressures adds an even greater urgency to the critical necessity for finding answers to these problems.

Solutions to these problems have been long sought but prior developments have not taught or suggested any solutions and, thus, solutions to these problems have long eluded those skilled in the art.

SUMMARY

An embodiment of the present invention provides a computing system, including: a communication unit configured to determine an interfering interface based on a device location for locating an interference-aware receiver for processing a receiver signal including an interference signal described by the interfering interface; and an inter-device interface, coupled with the communication unit, configured to communicate the interfering interface for communicating the interfering interface to the interference-aware receiver for processing the interference signal or a further instance thereof.

An embodiment of the present invention provides a method of operation of a computing system including: determining an interfering interface based on a device location for locating an interference-aware receiver for processing a receiver signal including an interference signal described by the interfering interface; and communicating the interfering interface for communicating the interfering interface to the interference-aware receiver for processing the interference signal or a further instance thereof.

An embodiment of the present invention provides a non-transitory computer readable medium including instructions for operating a computing system including: determining an interfering interface based on a device location for locating an interference-aware receiver for processing a receiver signal including an interference signal described by the interfering interface; and communicating the interfering interface for communicating the interfering interface to the interference-aware receiver for processing the interference signal or a further instance thereof.

Certain embodiments of the invention have other steps or elements in addition to or in place of those mentioned above. The steps or elements will become apparent to those skilled in the art from a reading of the following detailed description when taken with reference to the accompanying drawings.

DETAILED DESCRIPTION

Figure 1:
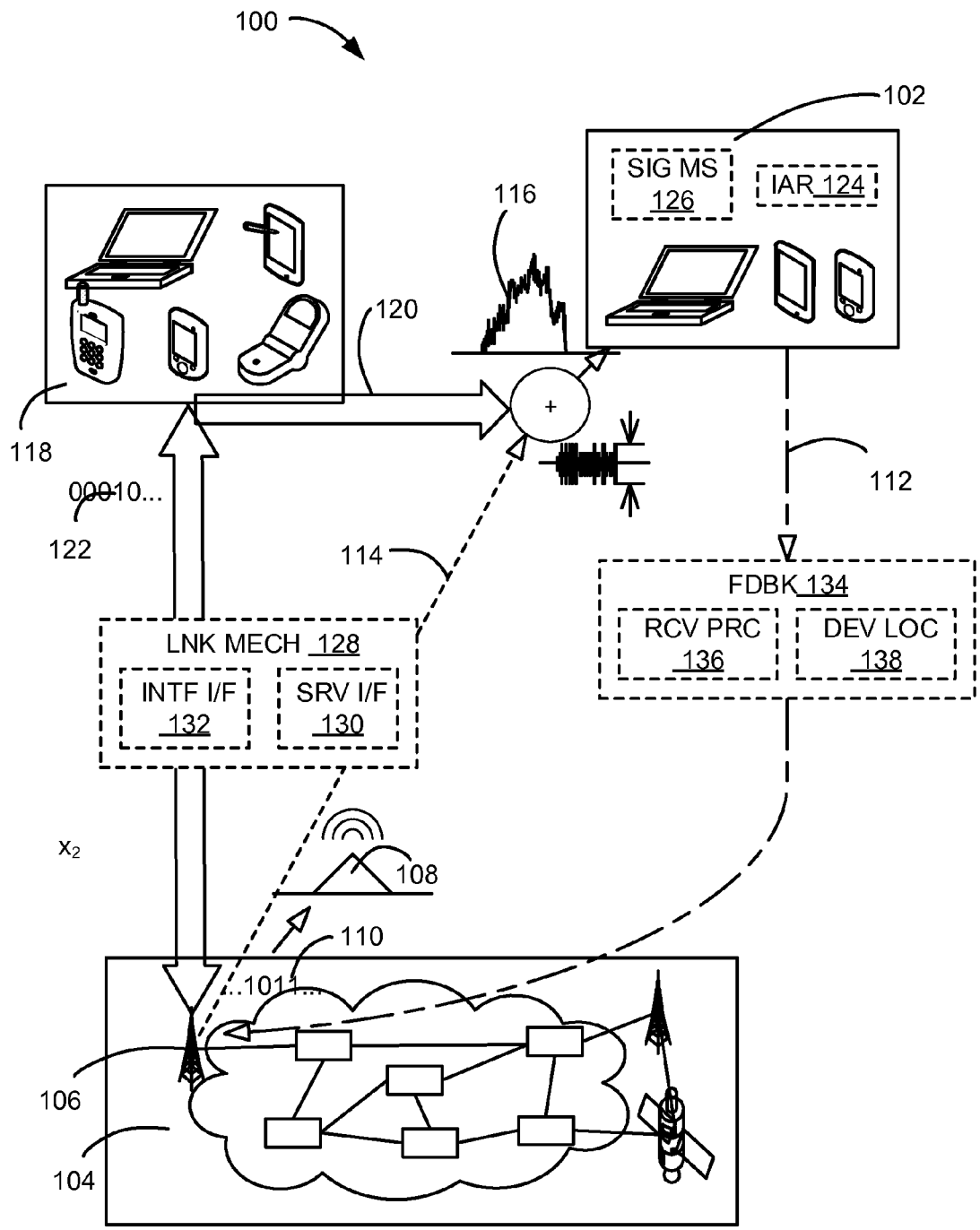
FIG. 1 is a computing system with interference cancellation mechanism in an embodiment of the present invention.

The following embodiments of the present invention can be used to determine a relevant interference source transmitting interference signal included in receiver signal. The relevant interference source can be based on device location. Interfering interface specific to the relevant interference source and describing the interference signal can be communicated between devices. Interference-aware receiver can be used to process the interference signal in recovering or estimating serving content from the receiver signal.

The following embodiments are described in sufficient detail to enable those skilled in the art to make and use the invention. It is to be understood that other embodiments would be evident based on the present disclosure, and that system, process, or mechanical changes may be made without departing from the scope of an embodiment of the present invention.

In the following description, numerous specific details are given to provide a thorough understanding of the invention. However, it will be apparent that the invention may be practiced without these specific details. In order to avoid obscuring an embodiment of the present invention, some well-known circuits, system configurations, and process steps are not disclosed in detail.

The drawings showing embodiments of the system are semi-diagrammatic, and not to scale and, particularly, some of the dimensions are for the clarity of presentation and are shown exaggerated in the drawing figures. Similarly, although the views in the drawings for ease of description generally show similar orientations, this depiction in the figures is arbitrary for the most part. Generally, the invention can be operated in any orientation. The embodiments have been numbered first embodiment, second embodiment, etc. as a matter of descriptive convenience and are not intended to have any other significance or provide limitations for an embodiment of the present invention.

The term "module" referred to herein can include or be implemented as software, hardware, or a combination thereof in the present invention in accordance with the context in which the term is used. For example, the software can be machine code, firmware, embedded code, and application software. The software can also include a function, a call to a function, a code block, or a combination thereof. Also for example, the hardware can be gates, circuitry, processor, computer, integrated circuit, integrated circuit cores, a pressure sensor, an inertial sensor, a microelectromechanical system (MEMS), passive devices, physical nontransitory memory medium having instructions for performing the software function, a portion therein, or a combination thereof.

The term "processing" as used herein includes manipulating signal and corresponding data, such as filtering, detecting, decoding, assembling data structures, transferring data structures, manipulating data structures, and reading and writing data structures. Data structures are defined to be information arranged as symbols, packets, blocks, files, input data, system generated data, such as calculated or generated data, and program data.

Referring now to FIG. 1, therein is shown a computing system 100 with interference cancellation mechanism in an embodiment of the present invention. The computing system 100 can include a first device, such as a user electronic device 102, connected to a network 104. The user electronic device 102 can include a portable or mobile device, a stationary device, a consumer device, a host device, or a combination thereof.

For example, the user electronic device 102 can include a mobile phone, a smart phone, a wearable device, an implanted device, a laptop or tablet computer, a vehicle, a portion therein, or a combination thereof. Also for example, the user electronic device 102 can include a router, a server, an object or an article including Internet of Things (IoT) capability or feature therein, a desktop computer, a portion therein, or a combination thereof. Also for example, the user electronic device 102 can include user equipment (UE).

The network 104 is a system of wired or wireless communication devices or means that are connected to each other for enabling communication between devices. For example, the network 104 can include a combination of wires, transmitters, receivers, antennas, towers, stations, repeaters, telephone network, servers, or client devices for a wireless cellular network. The network 104 can also include a combination of routers, cables, computers, servers, and client devices for various sized area networks, for a wireless cellular network, or a combination thereof.

The user electronic device 102 can communicate with or through the network 104. The user electronic device 102 can further communicate with a further instance of the user electronic device 102. The user electronic device 102 can communicate with the further instance of the user electronic device 102 either directly or through the network 104.

The computing system 100 can include a second device, such as an access node 106, for directly or indirectly linking and communicating with the first device 102. The network 104 can include the access node 106. The access node 106 can receive wireless or wired communication signals from the user electronic device 102, transmit signals to the user electronic device 102, process signals, or a combination thereof. The access node 106 can also relay signals between other instances of the access node 106, components within the network 104, or a combination thereof.

The user electronic device 102 can be connected to the network 104 through the access node 106. The access node 106 can sending signal to, receiving signals from, or a combination thereof in communicating and connecting the user electronic device 102.

For example, the access node 106 can include a router, a server, a gateway, a modem, a base station, a cell tower, a wireless router, an antenna, a portion therein, or a combination thereof. Also for example, the access node 106 can include a user device or a mobile device acting as a base station, an access point, a hub, a hotspot, a tethering point, a peer-to-peer network component, or a combination thereof. Also for example, the access node 106 can include an evolved node B (eNodeB) as an element in an air interface representing evolved UMTS terrestrial radio access (e-UTRA).

The access node 106 can be used to wirelessly exchange signals representing content for communication, including voice or sounds of a telephone call or data representing a webpage, text, a picture, an instruction, an interaction therewith, a control parameter, or a combination thereof. The access node 106 can also transmit reference signals, training signals, error detection signals, error correction signals, header information, transmission format, protocol information, or a combination thereof for enabling the communication of the content.

Based on the communication method, such as code division multiple access (CDMA), orthogonal frequency-division multiple access (OFDMA), Third Generation Partnership Project (3GPP), Long Term Evolution (LTE), or fourth generation (4G) standards, the communication signals can include a reference portion, a header portion, a format portion, an error correction or detection portion, or a combination thereof imbedded in the communicated information. The reference portion, header portion, format portion, error correction or detection portion, or a combination thereof can include a predetermined bit, pulse, wave, symbol, or a combination thereof. The various portions can be embedded within the communicated signals at regular time intervals, frequency, code, or a combination thereof.

The access node 106 and the user electronic device 102 can communicate serving signal 108 including serving content 110 intended for each other. The serving content 108 can include data from a transmitting device intended for communication by reproduction or processing at a receiving device. For example, the serving content 108 can be a sequence of bits intended for displaying, audibly recreating, executing instructions, storing, or a combination thereof at a particular receiving device, such as the user electronic device 102.

The access node 106, the user electronic device 102, or a combination thereof can generate the serving signal 108 based on the serving content 110. For example, the serving signal 108 can be generated by coding the serving content 110, such as according to turbo coding mechanism or polar coding mechanism. Also for example, the serving signal 108 can be generated as one or more symbols representing the serving content 110 according to a constellation or a modulation-coding scheme (MCS). Also for example, the serving signal 108 can be generated based on adding information, such as reference portion or header portion, rearranging the serving content 110, such as for interleaving or separating into multiple segments, or a combination thereof.

The serving signal 108 can be transmitted and received to communicate the serving content 110. The serving signal 108 can be transmitted from the user electronic device 102 as an uplink signal 112 to the access node 106. The serving signal 108 can also be transmitted from the access node 106 as a downlink signal 114 to the user electronic device 102.

The access node 106, the user electronic device 102, or a combination thereof can receive a receiver signal 116. The receiver signal 116 can include information detected at the access node 106, the user electronic device 102, or a combination thereof. The receiver signal 116 can include wireless signals, such as energy or voltage fluctuations perceived at the access node 106, the user electronic device 102, or a combination thereof. The receiver signal 116 can correspond to or include the serving signal 108.

For example, the receiver signal 116 can include information at the user electronic device 102 corresponding to the downlink signal 114. Also for example, the receiver signal 116 can include information at the access node 108 corresponding to the uplink signal 112.

The receiver signal 116 can include or correspond to the serving signal 108 changed or altered from traversing a communication channel between transmitting device and receiving device. For example, the communication channel can include a direct link between corresponding devices, such as between the user electronic device 102 and the access node 106. The communication channel can also include repeaters, amplifiers, or a combination thereof therebetween for an indirect link. The communication channel can include or correspond to a specific instance or value of communication detail, such as frequency, time slot, packet designation, transmission rate, channel code, or a combination thereof used for transmitting signals between intended devices.

The communication channel can further include physical characteristics unique to geographic locations associated with the intended devices. The communication channel can include structures or influences, such as fading characteristics of signals or causes for unique delay or reflection of signals, affecting the transmission of wireless signals. The communication channel can distort or alter the signals traversing therein, including delayed signals or echoes, degradation or loss in level or intensity, a distortion or an alteration in shape or pattern, or a combination thereof.

The receiver signal 116 can further include an interference signal 120 from an interference source. The interference source can include a device represented as a relevant interference source 118. The relevant interference source 118 can include a representation or an identification of a device causing interference for signals received at a different device. For example, the relevant interference source 118 can include a phone number, a serial number, a network identification, a cellular identification, a reference number, a unique code or frequency, a unique time slot or sequential placement, or a combination thereof.

The interference signal 120 can include communicated information not intended for the device receiving and processing the interference signal 118 at the time of the reception. The interference signal 120 can include signal transmitted by the user electronic device 102, the access node 106, or a combination thereof. The interference signal 120 can include the uplink signal 112, the downlink signal 114, or a combination thereof.

For example, the interference signal 120 can include communication signals representing or corresponding to interference content 122 transmitted by the interference source corresponding to the relevant interference source 118. Also for example, the interference signal 120 can include energy or signals detected or perceived at the user electronic device 102 or the access node 106 intended for a different device other than user electronic device 102, the access node 106, or a combination thereof.

The computing system 100 can include an interference-aware receiver 124 (IAR) for processing the receiver signal 116. The user electronic device 102, the access node 106, or a combination thereof can use the interference-aware receiver 124 to process the receiver signal 116.

The interference-aware receiver 124 is a device, or a portion therein, configured to process and utilize the interference signal 120 in processing for the serving signal 108. The interference-aware receiver 124 can decode the interference signal 120, or a portion of the receiver signal 116 corresponding thereto, to identify or recognize the interference content 122 unintended for communication with the interference-aware receiver 124. The interference-aware receiver 124 can use the decoded or identified instance of the interference content 122 in decoding the serving signal 108, or a portion of the receiver signal 116 corresponding thereto, to identify or recognize the serving content 110.

The interference-aware receiver 124 can include an interference-aware detector, an interference-aware decoder, or a combination thereof. The interference-aware receiver 124 can further include a joint-detector, a joint-decoder, an iterative detector-decoder, or a combination thereof configured to recognize, whiten, cancel or remove, detect, decode, or a combination thereof for the interference signal 120 or the interference content 122 in processing for the serving signal 108 or the serving content 110.

The interference-aware receiver 124 can calculate a comprehensive signal measure 126 corresponding to the receiver signal 116. The comprehensive signal measure 126 is a representation or a characterization of the serving signal 108, the interference signal 120, a noise contribution, an energy or power corresponding thereto, or a combination thereof. The comprehensive signal measure 126 can be represented as a ratio utilizing the serving signal 108, the interference signal 120, the noise contribution, a portion of the receiver signal 116 corresponding thereto, an energy or power corresponding thereto, or a combination thereof.

For example, the comprehensive signal measure 126 can be the representation or the characterization from the perspective of the user electronic device 102, the access node 106, or a combination thereof receiving and processing the receiver signal 116. Also for example, the comprehensive signal measure 126 can include a signal-to-interference ratio (SIR), a signal-to-noise ratio (SNR), an interference-to-noise ratio (INR), a signal-to-interference-plus-noise ratio (SINR), or a combination thereof.

The interference-aware receiver 124 can use the comprehensive signal measure 126 in decoding the serving content 110, the interference content 122, or a combination thereof. The interference-aware receiver 124 can further use information regarding a linking mechanism 128 for the serving signal 108, the interference signal 120, or a combination thereof.

The linking mechanism 128 can include specifics of enabling communication. The linking mechanism 128 can include control parameters describing mechanics of exchanging information. For example, the linking mechanism 128 can include information communicated over a physical channel, modulation coding scheme, format, protocol, communication frequency, communication code, time slot, identification, or a combination thereof specific for the serving signal 108, the interference signal 120, or a combination thereof.

The information regarding the linking mechanism 128 can include a serving interface 130, an interfering interface 132, or a combination thereof. The serving interface 130 can describe or identify the linking mechanism 128 specific for the serving signal 108. The interfering interface 132 can describe or identify the linking mechanism 128 specific for the interference signal 120, such as used for communicating the interference content 122 with a different device other than the user electronic device 102, the access node 106, or a combination thereof.

For brevity of description, the computing system 100 will be described with the receiver signal 116 received and processed at the user electronic device 102. However, it is understood that the receiver signal 116 can be received and processed at the access node 106.

The computing system 100 can communicate the information regarding the link mechanism 128 to the device receiving and processing the receiver signal 116. For example, the computing system 100 can communicate the serving interface 130, the interfering interface 132, or a combination thereof to the user electronic device 102 including the interference-aware receiver 124 through the access node 106 designated or intending to communicate the serving content 110 with the user electronic device 102.

The computing system 100 can further communicate device feedback 134 between the user electronic device 102 and the access node 106. The device feedback 134 can include information reported back from a receiving device to a corresponding transmitting device. The device feedback 134 can include information describing the receiver signal 116, a status or a request associated with processing the receiver signal 116, channel information, information describing the receiving device, or a combination thereof.

For example, the device feedback 134 can include the comprehensive signal measure 126, channel quality indicator (CQI), a repeat request, an acknowledgement, a channel measure, a complete channel knowledge, a portion thereof, or a combination thereof. Also for example, the device feedback 134 can include a receiver processing parameter 136, a device-location 138, or a combination thereof.

The receiver processing parameter 136 is information regarding the processing of the receiver signal 116. The receiver processing parameter 136 can include a report to a serving base station regarding a decision or a status for processing the interference signal 120 along with the serving signal 108, such as selection of a specific process, or a decision or ability to process for the interference content 122 in processing for the serving content 110. The receiver processing parameter 136 can further include a report regarding the receiver signal 116, such as description of the channel, the comprehensive signal measure 126, or a combination thereof.

The receiver processing parameter 136 can further include a request for information regarding the interference signal 120 or the linking mechanism 128 thereof, such as the interfering interface 132. The receiver processing parameter 136 can further include any information available at the receiving device, such as from detecting or processing the receiver signal 116 including the interference signal 120, for describing or identifying the interference source, such as frequency, reference information, any determinable aspect of the linking mechanism 128, or a combination thereof for the interference signal 120.

The device-location 138 is information describing geographic location of the reporting device. The device-location 138 can include a report for notifying the serving base station the geographic location of the corresponding receiver.

For example, the device-location 138 can include coordinate, direction, movement information, relative positioning, distance, or a combination thereof for locating the user electronic equipment 102. Also for example, the device-location 138 can be according to a mechanism, a process, a standard, or a combination thereof, such as for LTE UE position function in LTE Evolved Universal Terrestrial Access Network (E-UTRAN).

The device-location 138 can further be determined by the serving base station. For example, the device-location 138 measure signal strength from various instances of the user electronic device 102, interference signals seen at various instances of the user electronic device 102 as reported by the receiver processing parameter 136, or a combination thereof. The access node 106 can calculate the device-location 138 corresponding to one or more instances of the user electronic device 102 based on the measured signal strength or interference signal measures.

The computing system 100 can determine the relevant interference source 118 relative to the user electronic device 102 based on the device location 138 of the user electronic device 102, the relevant interference source 118, or a combination thereof. The computing system 100 can determine the interfering interface 132 corresponding to the interference signal 120 perceived or received at the user electronic device 120 through the receiver signal 116.

The computing system 100 can communicate the interfering interface 132 to the user electronic device 102 through the access node 106 serving the user electronic device 102. The user electronic device 102 can process for the interference content 122 from the receiver signal 116 using the interfering interface 132 with the interference-aware receiver 124, and further utilize the interference content 122 in recovering the serving content 110. Details regarding the process for determining, communicating, and utilizing the interfering interface 132 are be described below.

For illustrative purposes, the computing system 100 is described as the base station communicating information to the mobile device, such as the base station transmitting and the mobile device receiving the information. However, it is understood that the mobile device can communicate directly to each other or to the base station.

For further illustrative purposes, the computing system 100 is described as having one instance of the serving signal 108 and one instance of the interference signal 120 relative to communicating between the user electronic device 102 and the access node 106. However, it is understood that the computing system 100 can experience and process for multiple interference signals and sources, multiple layers, or a combination thereof. The computing system 100 can coordinate and process the communication of signals with two or more instances of the base stations.

Figure 2:
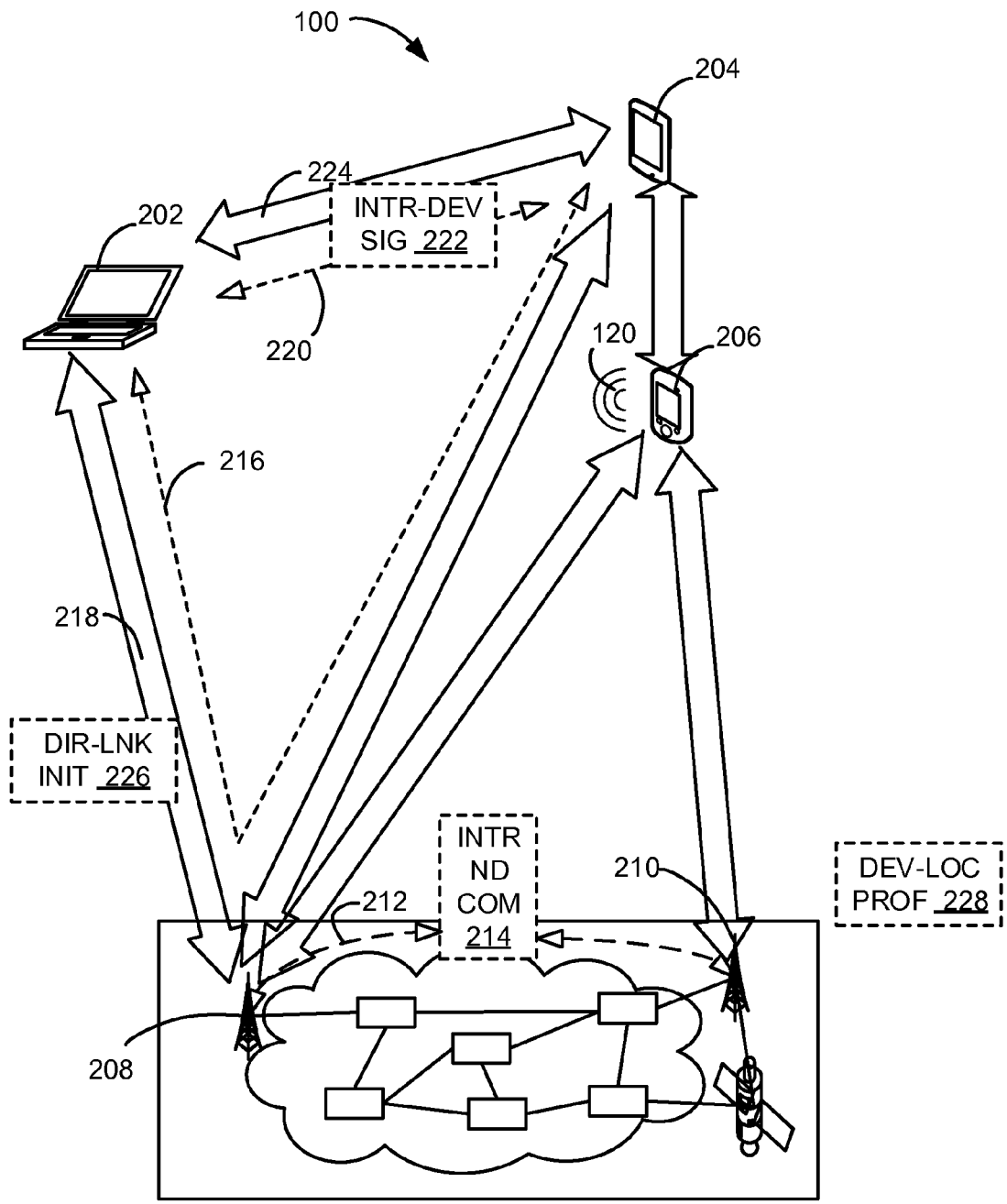
FIG. 2 is an exemplary illustration of the computing system.

Referring now to FIG. 2, therein is an exemplary illustration of the computing system 100. The computing system 100 can include multiple instances of the user electronic device 102 of FIG. 1, multiple instances of the access node 106 of FIG. 1, or a combination thereof. For example, the computing system 100 can include a first user device 202, a second user device 204, a third user device 206, a first node device 208, a second node device 210, or a combination thereof.

The computing system 100 can include or implement various types or modes of communication between devices. For example, instances of the access node 106 can be connected by one or more instances of node link 212. The node link 212 can include a method, a process, or a mechanism for directly communicating information between instances of the access node 106, such as between the first node device 208 and the second node device 210.

For example, the node link 212 can include a coordinating device for managing the first node device 208, the second node device 210, or a combination thereof. Also for example, the node link 212 can include a wired or wireless communication channel or connection, exchanged information, communication protocol, a method or a process for further processing the exchanged information, or a combination thereof between the first node device 208 and the second node device 210. As a more specific example, the node link 212 can include a back-haul channel for communicating between base stations.

The node link 212 can be used to communicate inter-node communication 214. The inter-node communication 214 can include information exchanged between the first node device 208 and the second node device 210.

The inter-node communication 214 can be information used to adjust simultaneous or concurrent transmissions for coordinating multiple communications. For example, the inter-node communication 214 can exchange the device location 138 of FIG. 1, identification information for the user electronic device 102, the receiver processing parameter 136 of FIG. 1, interference information at the receiving device, information regarding the linking mechanism 128 of FIG. 1 corresponding to the communication, or a combination thereof.

The computing system 100 can further include or implement a node-relaying communication 216. The node-relaying communication 216 is a mode or a type of communication utilizing the access node 106 to communicate between instances of the user electronic device 102. The access node 106 can link instances of the user electronic device 102, relay information between instances of the user electronic device 102, or a combination thereof.

For example, the first user device 202 communicating with the second user device 204, the third user device 206, or a combination thereof can communicate the serving signal 108 of FIG. 1 directly with the first node device 208. The first node device 208 can relay the communication by directly communicating with the second user device 204, the third user device 206, or a combination thereof targeted or intended for receiving the serving content 110 of FIG. 1.

Continuing with the example, the first node device 208 can further relay the communication by communicating through the network 104 of FIG. 1 to the second node device 210. The second node device 210 can directly communicate with the second user device 204, the third user device 206, or a combination thereof targeted or intended for receiving the serving content 110.

The mode-relaying communication 216 can be based on a node-channel 218. The node-channel 218 is a path or a link for signal exchange including physical or wireless connections, protocols, route, or a combination thereof linking instances of the user electronic device 102 at end points and one or more instances of the access node 106 relaying the serving content 110.

The node-channel 218 can include instances of the linking mechanism 128 corresponding to instances of the user electronic device 102. Continuing with the above example, the node-channel 218 can include the linking mechanism 128 corresponding to the first user device 202 communicating through the first node device 208, the linking mechanism 128 corresponding to the second user device 204, the third user device 206, or a combination thereof communicating through the first node device 208, the second node device 210, or a combination thereof.

The computing system 100 can further include or implement a direct-link communication 220. The direct-link communication 220 is a mode or a type of communication for providing cellular communication directly between instances of the user electronic device 102 without utilizing the access node 106 to relay the signals.

The receiver signal 116 of FIG. 1 at a receiving device can include the serving signal 108 from the user electronic device 102 instead of the access node 106. The access node 106 can designate the linking mechanism 128 for establishing the direct-link communication 220 for directly communicating between the first user device 202 and the second user device 204, the third user device 206, or a combination thereof.

The direct-link communication 220 can include cellular communications, such as voice, text, image, instructions, or a combination of data exchanged between instances of the user electronic device 102. The direct-link communication 220 can be based on the linking mechanism 128, such as using baseband device, using designated carrier frequency or frequency band, MCS, coding, time slots, signal strength, communication standard or protocol, or a combination thereof available for cellular communications.

The direct-link communication 220 can be separate from connecting to accessory devices and separate from connecting using non-cellular protocols. For example, the direct-link communication 220 can be separate from Bluetooth communication, near field communication (NFC), or a combination thereof. Also for example, the direct-link communication 220 can be separate from fix frequency dedicated communication, such as used in walkie-talkies or various signal broadcasts.

The instances of the user electronic device 102 can exchange inter-device signal 222 using direct-link channel 224. The inter-device signal 222 can include the serving signal 108 transmitted for direct communication to an intended end device instead of the access node 106, and without going through the access node 106. The inter-device signal 222 can communicate the serving content 110. The inter-device signal 222 can function as or be perceived as the interference signal 120 at an unintended receiver.

The direct-link channel 224 is a path or a link for signal exchange including physical or wireless connections, protocols, route, or a combination thereof directly linking instances of the user electronic device 102. The direct-link channel 224 can include a connection between grouped instances of the user electronic device 102 without any other device there-between, without the access node 106 there-between, or a combination thereof.

The direct-link communication 220 can utilize a direct-link initiation 226. The direct-link initiation 226 is information, step, process, trigger, or a combination thereof for initiating the process for establishing the direct-link communication 220. The direct-link initiation 226 can include a request, a command, or a combination thereof generated and transmitted by one device to another for establishing the direct-link communication 220. The direct-link initiation 226 can include the first external communication in establishing the direct-link communication 220.

For example, the direct-link communication 220 can include a message, a request, a command, or a combination thereof from the user electronic device 102 for initiating the establishment of the direct-link communication 220. Also for example, the direct-link communication 220 can include a message, a request, a command, or a combination thereof from the access node 106 for initiating the establishment of the direct-link communication 220.

The direct-link channel 224 can include the linking mechanism 128 corresponding to the grouped instances of the user electronic device 102. For example, the first user device 202 can be connected to the second user device 204, the third device 206, or a combination thereof through corresponding instance of the linking mechanism 128. Also for example, the direct-link channel 224 can be established, designated, assigned, or controlled by the access node 106, such as the first node device 208 or the second node device 210, but without the access device 106 included in the direct-link channel 224 and without relaying the serving content 110.

The transmitted signals for the direct-link communication 220, the node-relaying communication 216, or a combination thereof can be received at a receiving device as the interference signal 120 or the serving signal 108 in the receiver signal 116. For example, the interference signal 120 can include the uplink signal 112 of FIG. 1 from the user electronic equipment 102, the downlink signal 114 of FIG. 1 from the access node 106, or a combination thereof for the node-relaying communication 216. Also for example, the interference signal 120 can include the inter-device signal 222 from the user electronic equipment 102.

The computing system 100 can communicate information regarding the linking mechanism 128 for the interference signal 120 for the direct-link communication 220, the node-relaying communication 216, or a combination thereof to the receiving device including the interference-aware receiver 124 of FIG. 1. For example, the interfering interface 132 of FIG. 1 can describe or correspond to the uplink signal 112, the downlink signal 114, the inter-device signal 222, or a combination thereof. Also for example, the interfering interface 132 can describe or correspond to signals transmitted by the user electronic device 102.

The computing system 100 can communicate information regarding the linking mechanism 128 based on the device location 138. The computing system 100 can determine appropriate instance of the relevant interference source 118 of FIG. 1 corresponding to the interference signal 120 for the specific receiving device.

The computing system 100 can determine the linking mechanism 128 corresponding to the relevant interference source 118 for communicating to the specific receiving device. The computing system 100 can share information, coordinate, determine, or a combination thereof using the inter-node communication 214 shared over the node link 212 for determining the relevant interference source 118 or the corresponding instance of the linking mechanism 128, locations of the devices, conditions or signal strengths observed by the devices, or a combination thereof.

The computing system 100 can generate and manage a device-location profile 228. The device-location profile 228 is a collection of information regarding locations of various devices in the computing system 100. The device-location profile 228 can be based on or include the device location 138 for various instances of the user electronic device 102. The device-location profile 228 can further include relative locations of devices, distances between devices, channel conditions between devices, or a combination thereof.

For example, the device-location profile 228 can include the device location 138 corresponding to the first user device 202, the second user device 204, the third user device 206, or a combination thereof, such as first-device location, second-device location, third-device location, or a combination thereof. Also for example, the device-location profile 228 can include the device location 138 corresponding to various instances of the user electronic device 102 served by the first node device 208, the second node device 210, or a combination thereof.

For illustrative purposes, the first user device 202 will be described as the reference device or the specific receiving device with the third user device 206 as the source of the interference signal 120. The second user device 204 will be for describing the direct-link communication 220 with the first user device 202 or the third user device 206. The first node device 208 will be for describing the node-relaying communication 216 with the first user device 202. However, it is understood that the computing system 100 can perform the described processes with respect to any one or a combination of the devices.

Further for illustrative purposes, the computing system 100 will be described with respect to one instance of the access node 106 associated with the various communications. However, it is understood that the computing system 100 can include the described processes shared across multiple instances of the access node 106. It is also understood that the computing system 100 can share information, coordinate, determine, or a combination thereof for processing across multiple instances of the access node 106, multiple instances of the user electronic equipment 102 corresponding to different instances of the access node 106, or a combination thereof.

Figure 3:
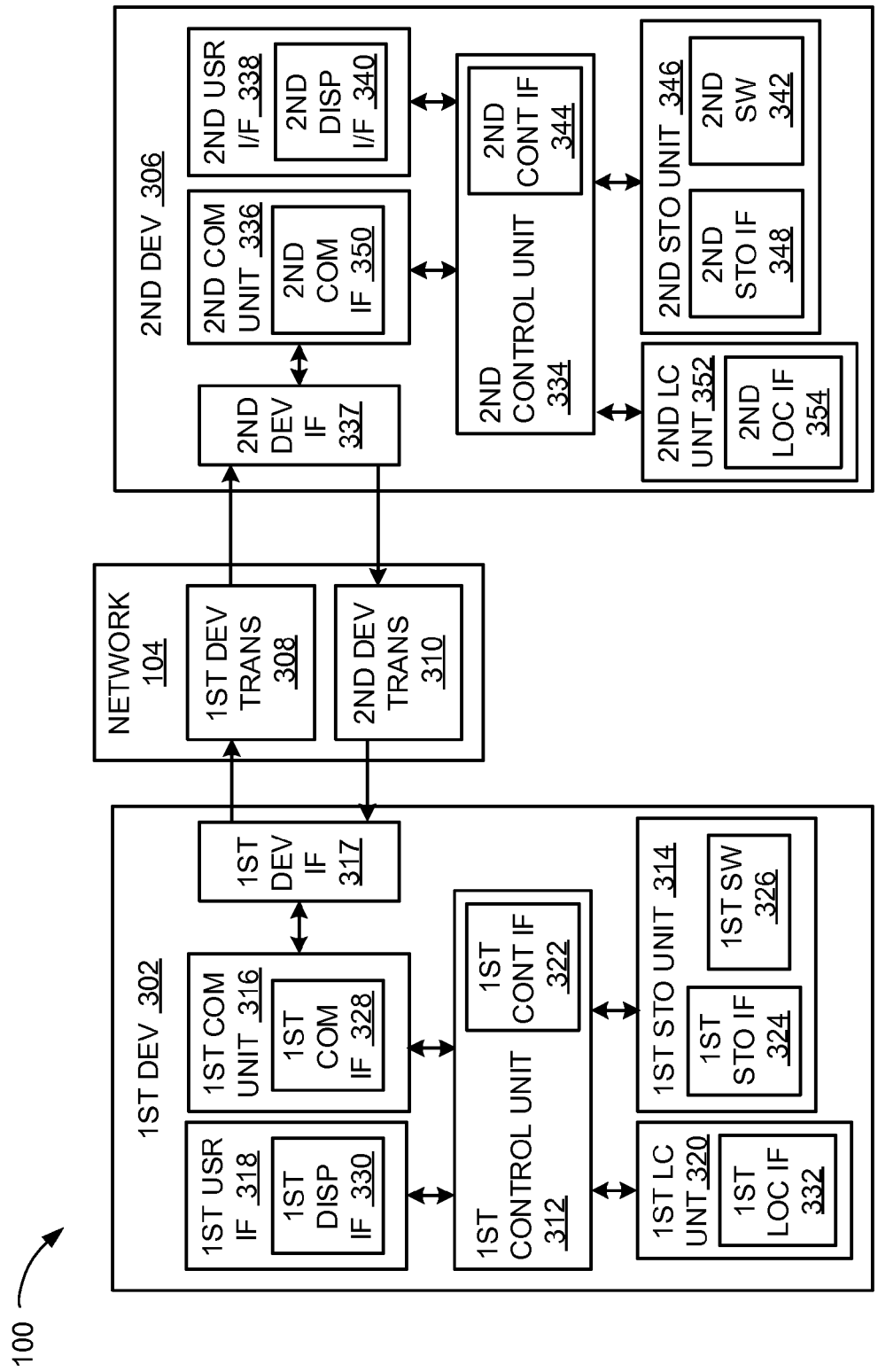
FIG. 3 is an exemplary block diagram of the computing system.

Referring now to FIG. 3, therein is shown an exemplary block diagram of the computing system 100. The computing system 100 can include a first device 302, the network 104, and a second device 306. The first device 302, the second device 306, or a combination thereof can illustrate the user electronic device 102 of FIG. 1, the access node 106 of FIG. 1, or a combination thereof. For example, the first device 302, the second device 306, or a combination thereof can exemplify the first user device 202 of FIG. 2, the second user device 204 of FIG. 2, the third user device 206 of FIG. 2, the first node device 208 of FIG. 2, the second node device 210 of FIG. 2, or a combination thereof.

The first device 302 can send information in a first device transmission 308 over the network 104 to the second device 306. The second device 306 can send information in a second device transmission 310 over the network 104 to the first device 302.

For illustrative purposes, the computing system 100 is shown with the first device 302 as a client device, although it is understood that the computing system 100 can have the first device 302 as a different type of device. For example, the first device 302 can be a server having a display interface.

Also for illustrative purposes, the computing system 100 is shown with the second device 306 as a base station, although it is understood that the computing system 100 can have the second device 306 as a different type of device. For example, the second device 306 can be a client device.

For brevity of description in this embodiment of the present invention, the first device 302 will be described as a client device and the second device 306 will be described as a server device. The embodiment of the present invention is not limited to this selection for the type of devices. The selection is an example of an embodiment of the present invention.

The first device 302 can include a first control unit 312, a first storage unit 314, a first communication unit 316, a first user interface 318, and a first location unit 320. The first control unit 312 can include a first control interface 322. The first control unit 312 can execute a first software 326 to provide the intelligence of the computing system 100.

The first control unit 312 can be implemented in a number of different manners. For example, the first control unit 312 can be a processor, an application specific integrated circuit (ASIC) an embedded processor, a microprocessor, a hardware control logic, a hardware finite state machine (FSM), a digital signal processor (DSP), or a combination thereof. The first control interface 322 can be used for communication between the first control unit 312 and other functional units in the first device 302. The first control interface 322 can also be used for communication that is external to the first device 302.

The first control interface 322 can receive information from the other functional units or from external sources, or can transmit information to the other functional units or to external destinations. The external sources and the external destinations refer to sources and destinations external to the first device 302.

The first control interface 322 can be implemented in different ways and can include different implementations depending on which functional units or external units are being interfaced with the first control interface 322. For example, the first control interface 322 can be implemented with a pressure sensor, an inertial sensor, a microelectromechanical system (MEMS), optical circuitry, waveguides, wireless circuitry, wireline circuitry, or a combination thereof.

The first storage unit 314 can store the first software 326. The first storage unit 314 can also store the relevant information, such as data representing incoming images, data representing previously presented image, sound files, or a combination thereof.

The first storage unit 314 can be a volatile memory, a nonvolatile memory, an internal memory, an external memory, or a combination thereof. For example, the first storage unit 314 can be a nonvolatile storage such as non-volatile random access memory (NVRAM), Flash memory, disk storage, or a volatile storage such as static random access memory (SRAM).

The first storage unit 314 can include a first storage interface 324. The first storage interface 324 can be used for communication between the first storage unit 314 and other functional units in the first device 302. The first storage interface 324 can also be used for communication that is external to the first device 302.

The first storage interface 324 can receive information from the other functional units or from external sources, or can transmit information to the other functional units or to external destinations. The external sources and the external destinations refer to sources and destinations external to the first device 302.

The first storage interface 324 can include different implementations depending on which functional units or external units are being interfaced with the first storage unit 314. The first storage interface 324 can be implemented with technologies and techniques similar to the implementation of the first control interface 322.

The first communication unit 316 can enable external communication to and from the first device 302. For example, the first communication unit 316 can permit the first device 302 to communicate with the second device 306, a different device, an attachment, such as a peripheral device or a desktop computer, the network 104, or a combination thereof.

The first communication unit 316 can also function as a communication hub allowing the first device 302 to function as part of the network 104 and not limited to be an end point or terminal unit to the network 104. The first communication unit 316 can include active and passive components, such as microelectronics or an antenna, for interaction with the network 104.

The first communication unit 316 can include a baseband device or component, a modem, a digital signal processor, or a combination thereof for transmitting, formatting, receiving, detecting, decoding, further processing, or a combination thereof for communication signals. The first communication unit 316 can include one or more portions for processing the voltages, the currents, the digital information, or a combination thereof, such as an analog-to-digital converter, a digital-to-analog converter, a filter, an amplifier, a processor-type circuitry, or a combination thereof. The first communication unit 316 can further include one or more portions for storing information, such as cache or RAM memory, registers, or a combination thereof.

The first communication unit 316 can be coupled with a first inter-device interface 317. The first inter-device interface 317 can be a device or a portion of a device for physically communicating signals with a separate device. The first inter-device interface 317 can communicate by transmitting or receiving signals to or from another device. The first inter-device interface 317 can include one or more antennas for wireless signals, a physical connection and receiver-transmitter for wired signals, or a combination thereof. The first inter-device interface 317 can include an omnidirectional antenna, a wire, an antenna chip, a ceramic antenna, or a combination thereof. The first inter-device interface 317 can further include a port, a wire, a repeater, a connector, a filter, a sensor, or a combination thereof.

The first inter-device interface 317 can detect or respond to a power in electromagnetic waves and provide the detected result to the first communication unit 316 to receive a signal, including the second device transmission 310. The first inter-device interface 317 can provide a path or respond to currents or voltages provided by the first communication unit 316 to transmit a signal, including the first device transmission 308.

The first communication unit 316 can include a first communication interface 328. The first communication interface 328 can be used for communication between the first communication unit 316 and other functional units in the first device 302. The first communication interface 328 can receive information from the other functional units or can transmit information to the other functional units.

The first communication interface 328 can include different implementations depending on which functional units are being interfaced with the first communication unit 316. The first communication interface 328 can be implemented with technologies and techniques similar to the implementation of the first control interface 322.

The first user interface 318 allows a user (not shown) to interface and interact with the first device 302. The first user interface 318 can include an input device and an output device. Examples of the input device of the first user interface 318 can include a keypad, a touchpad, soft-keys, a keyboard, a microphone, an infrared sensor for receiving remote signals, or any combination thereof to provide data and communication inputs.

The first user interface 318 can include a first display interface 330. The first display interface 330 can include an output device. The first display interface 330 can include a display, a projector, a video screen, a speaker, or any combination thereof.

The first control unit 312 can operate the first user interface 318 to display information generated by the computing system 100. The first control unit 312 can also execute the first software 326 for the other functions of the computing system 100, including receiving location information from the first location unit 420. The first control unit 312 can further execute the first software 326 for interaction with the network 104 via the first communication unit 316.

The first location unit 420 can generate location information, current heading, current acceleration, and current speed of the first device 102, as examples. The first location unit 420 can be implemented in many ways. For example, the first location unit 420 can function as at least a part of the global positioning system, an inertial navigation system, a cellular-tower location system, a pressure location system, or any combination thereof. Also, for example, the first location unit 420 can utilize components such as an accelerometer or GPS receiver.

The first location unit 320 can include a first location interface 332. The first location interface 332 can be used for communication between the first location unit 320 and other functional units in the first device 302. The first location interface 332 can also be used for communication external to the first device 302.

The first location interface 332 can receive information from the other functional units or from external sources, or can transmit information to the other functional units or to external destinations. The external sources and the external destinations refer to sources and destinations external to the first device 302.

The first location interface 332 can include different implementations depending on which functional units or external units are being interfaced with the first location unit 320. The first location interface 332 can be implemented with technologies and techniques similar to the implementation of the first control unit 312.

The second device 306 can be optimized for implementing an embodiment of the present invention in a multiple device embodiment with the first device 302. The second device 306 can provide the additional or higher performance processing power compared to the first device 302. The second device 306 can include a second control unit 334, a second communication unit 336, a second user interface 338, and a second storage unit 346. The second device 306 can further include a second location unit 352, such as for a mobile device.

The second user interface 338 allows a user (not shown) to interface and interact with the second device 306. The second user interface 338 can include an input device and an output device. Examples of the input device of the second user interface 338 can include a keypad, a touchpad, softkeys, a keyboard, a microphone, or any combination thereof to provide data and communication inputs. Examples of the output device of the second user interface 338 can include a second display interface 340. The second display interface 340 can include a display, a projector, a video screen, a speaker, or any combination thereof.

The second control unit 334 can execute a second software 342 to provide the intelligence of the second device 306 of the computing system 100. The second software 342 can operate in conjunction with the first software 326. The second control unit 334 can provide additional performance compared to the first control unit 312.

The second control unit 334 can operate the second user interface 338 to display information. The second control unit 334 can also execute the second software 342 for the other functions of the computing system 100, including operating the second communication unit 336 to communicate with the first device 302 over the network 104, including receiving location information from the second location unit 352, or a combination thereof.

The second control unit 334 can be implemented in a number of different manners. For example, the second control unit 334 can be a processor, an embedded processor, a microprocessor, hardware control logic, a hardware finite state machine (FSM), a digital signal processor (DSP), or a combination thereof.

The second control unit 334 can include a second control interface 344. The second control interface 344 can be used for communication between the second control unit 334 and other functional units in the second device 306. The second control interface 344 can also be used for communication that is external to the second device 306.

The second control interface 344 can receive information from the other functional units or from external sources, or can transmit information to the other functional units or to external destinations. The external sources and the external destinations refer to sources and destinations external to the second device 306.

The second control interface 344 can be implemented in different ways and can include different implementations depending on which functional units or external units are being interfaced with the second control interface 344. For example, the second control interface 344 can be implemented with a pressure sensor, an inertial sensor, a microelectromechanical system (MEMS), optical circuitry, waveguides, wireless circuitry, wireline circuitry, or a combination thereof.

A second storage unit 346 can store the second software 342. The second storage unit 346 can also store the information such as data representing incoming images, data representing previously presented image, sound files, or a combination thereof. The second storage unit 346 can be sized to provide the additional storage capacity to supplement the first storage unit 314.

For illustrative purposes, the second storage unit 346 is shown as a single element, although it is understood that the second storage unit 346 can be a distribution of storage elements. Also for illustrative purposes, the computing system 100 is shown with the second storage unit 346 as a single hierarchy storage system, although it is understood that the computing system 100 can have the second storage unit 346 in a different configuration. For example, the second storage unit 346 can be formed with different storage technologies forming a memory hierarchal system including different levels of caching, main memory, rotating media, or off-line storage.

The second storage unit 346 can be a volatile memory, a nonvolatile memory, an internal memory, an external memory, or a combination thereof. For example, the second storage unit 346 can be a nonvolatile storage such as non-volatile random access memory (NVRAM), Flash memory, disk storage, or a volatile storage such as static random access memory (SRAM).

The second storage unit 346 can include a second storage interface 348. The second storage interface 348 can be used for communication between the second storage unit 346 and other functional units in the second device 306. The second storage interface 348 can also be used for communication that is external to the second device 306.

The second storage interface 348 can receive information from the other functional units or from external sources, or can transmit information to the other functional units or to external destinations. The external sources and the external destinations refer to sources and destinations external to the second device 306.

The second storage interface 348 can include different implementations depending on which functional units or external units are being interfaced with the second storage unit 346. The second storage interface 348 can be implemented with technologies and techniques similar to the implementation of the second control interface 344.

The second communication unit 336 can enable external communication to and from the second device 306. For example, the second communication unit 336 can permit the second device 306 to communicate with the first device 302 over the network 104.

The second communication unit 336 can also function as a communication hub allowing the second device 306 to function as part of the network 104 and not limited to be an end point or terminal unit to the network 104. The second communication unit 336 can include active and passive components, such as microelectronics or resistors, for interaction with the network 104.

The second communication unit 336 can include a baseband device or component, a modem, a digital signal processor, or a combination thereof for transmitting, formatting, receiving, detecting, decoding, further processing, or a combination thereof for communication signals. The second communication unit 336 can include one or more portions for processing the voltages, the currents, the digital information, or a combination thereof, such as an analog-to-digital converter, a digital-to-analog converter, a filter, an amplifier, a processor-type circuitry, or a combination thereof. The second communication unit 336 can further include one or more portions for storing information, such as cache or RAM memory, registers, or a combination thereof.

The second communication unit 336 can be coupled with a second inter-device interface 337. The second inter-device interface 337 can be a device or a portion of a device for physically communicating signals with a separate device. The second inter-device interface 337 can communicate by transmitting or receiving signals to or from another device. The second inter-device interface 337 can include one or more antennas for wireless signals, a physical connection and receiver-transmitter for wired signals, or a combination thereof. The second inter-device interface 337 can include an omnidirectional antenna, a wire, an antenna chip, a ceramic antenna, or a combination thereof. The second inter-device interface 337 can further include a port, a wire, a repeater, a connector, a filter, a sensor, or a combination thereof.

The second inter-device interface 337 can detect or respond to a power in electromagnetic waves and provide the detected result to the second communication unit 336 to receive a signal, including the first device transmission 308. The second inter-device interface 337 can provide a path or respond to currents or voltages provided by the second communication unit 336 to transmit a signal, including the second device transmission 310.

The second communication unit 336 can include a second communication interface 350. The second communication interface 350 can be used for communication between the second communication unit 336 and other functional units in the second device 306. The second communication interface 350 can receive information from the other functional units or can transmit information to the other functional units.

The second communication interface 350 can include different implementations depending on which functional units are being interfaced with the second communication unit 336. The second communication interface 350 can be implemented with technologies and techniques similar to the implementation of the second control interface 344.

The second location unit 352 can generate location information, current heading, current acceleration, and current speed of the second device 306, as examples. The second location unit 352 can be implemented in many ways. For example, the second location unit 352 can function as at least a part of the global positioning system, an inertial navigation system, a cellular-tower location system, a pressure location system, or any combination thereof. Also, for example, the second location unit 352 can utilize components such as an accelerometer or GPS receiver.

The second location unit 352 can include a second location interface 354. The second location interface 354 can be used for communication between the second location unit 352 and other functional units in the second device 306. The second location interface 354 can also be used for communication external to the second device 306.

The second location interface 354 can receive information from the other functional units or from external sources, or can transmit information to the other functional units or to external destinations. The external sources and the external destinations refer to sources and destinations external to the second device 306.

The second location interface 354 can include different implementations depending on which functional units or external units are being interfaced with the second location unit 352. The second location interface 354 can be implemented with technologies and techniques similar to the implementation of the second control unit 334.

The first communication unit 316 can utilize the node-relaying communication 216 of FIG. 2 or the direct-link communication 220 to send information to the second device 306 in the first device transmission 308. The second device 306 can receive information in the second communication unit 336 from the first device transmission 308 according to the node-relaying communication 216 or the direct-link communication 220.

The second communication unit 336 can utilize the node-relaying communication 216 or the direct-link communication 220 to send information to the first device 302 in the second device transmission 310. The first device 302 can receive information in the first communication unit 316 from the second device transmission 310 according to the node-relaying communication 216 or the direct-link communication 220.

The computing system 100 can be executed by the first control unit 312, the second control unit 334, or a combination thereof. For illustrative purposes, the second device 306 is shown with the partition having the second user interface 338, the second storage unit 346, the second control unit 334, and the second communication unit 336, although it is understood that the second device 306 can have a different partition. For example, the second software 342 can be partitioned differently such that some or all of its function can be in the second control unit 334 and the second communication unit 336. Also, the second device 306 can include other functional units not shown in FIG. 3 for clarity.

The functional units in the first device 302 can work individually and independently of the other functional units.

The first device 302 can work individually and independently from the second device 306 and the network 104.

The functional units in the second device 306 can work individually and independently of the other functional units. The second device 306 can work individually and independently from the first device 302 and the network 104.

The functional units described above can be implemented in hardware. For example, one or more of the functional units can be implemented using the a gate, circuitry, a processor, a computer, integrated circuit, integrated circuit cores, a pressure sensor, an inertial sensor, a microelectromechanical system (MEMS), a passive device, a physical non-transitory memory medium having instructions for performing the software function, a portion therein, or a combination thereof.

For illustrative purposes, the computing system 100 is described by operation of the first device 302 and the second device 306. It is understood that the first device 302 and the second device 306 can operate any of the modules and functions of the computing system 100.

Figure 4:
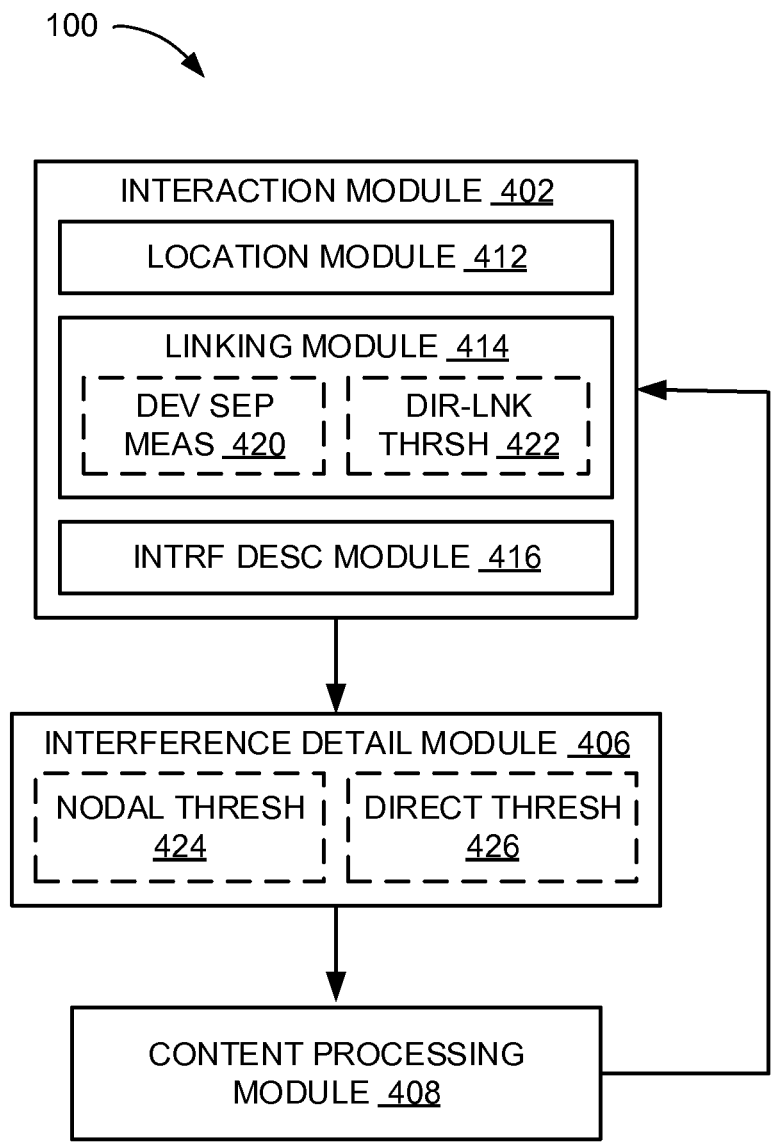
FIG. 4 is a control flow of the computing system.

Referring now to FIG. 4, therein is shown a control flow of the computing system 100. The computing system 100 can include an interaction module 402, an interference detail module 404, a content processing module 406, or a combination thereof. The interaction module 402 can be coupled with the interference detail module 404, which can be further coupled with the content processing module 406.

The modules can be coupled to each other in a variety of ways. For example, modules can be coupled by having the input of one module connected to the output of another, such as by using wired or wireless connections, the network 104 of FIG. 1, instructional steps, process sequence, or a combination thereof. Also for example, the modules can be coupled either directly with no intervening structure other than connection means between the directly coupled modules, or indirectly with modules or devices other than the connection means between the indirectly coupled modules.

As a more specific example, one or more inputs or outputs of the interaction module 402 can be connected to one or more inputs or inputs of the interference detail module 404 using conductors or the transmission channel without intervening modules or devices there-between. Also for example, the interaction module 402 can be coupled to the interference detail module 404 indirectly using a wireless channel with a repeater, a switch, a routing device, or a combination thereof. The interaction module 402, the interference detail module 404, the content processing module 406, or a combination thereof can be coupled in similar ways.

The computing system 100 can communicate with or using a device, such as by displaying images, recreating sounds, exchanging process steps or instructions, or a combination thereof. The computing system 100 can communicate information between devices. The receiving device can further communicate with the user by displaying images, recreating sounds, exchanging process steps or instructions, or a combination thereof according to the information communicate to the device.

The interaction module 402 is configured to establish, manage, or a combination of processes thereof for communications between devices for the computing system 100. The interaction module 402 can establish, manage, or a combination thereof for the node-relaying communication 216 of FIG. 2, the direct-link communication 220 of FIG. 2, or a combination thereof.

The interaction module 402 can further communicate, such as by transmitting, receiving, processing, or a combination thereof for control information. For example, the interaction module 402 can communicate information regarding the linking mechanism 128 of FIG. 1, the device feedback 134 of FIG. 1, or a combination thereof. The interaction module 402 can include a location module 412, a linking module 414, an interference description module 416, or a combination thereof.

The location module 412 is configured to locate and track various devices for the computing system 100. The location module 412 can communicate the device feedback 134 including the device location 138 of FIG. 1 corresponding to one or more instances of the user electronic device 102 of FIG. 1.

For example, the location module 412 can include the first user device 202 of FIG. 2, the second user device 204 of FIG. 2, the third user device 206 of FIG. 2, or a combination thereof transmitting the device location 138 corresponding thereto. Also for example, the location module 412 can include the access node 106 of FIG. 1, such as the first node device 208 of FIG. 2, the second node device 210 of FIG. 2, or a combination thereof receiving the device feedback 134 including the device location 138.

The location module 412 can further calculate the device location 138 for one or more of instances of the user electronic device 102 for the computing system 100. The location module 412 can calculate the device location 138 using the first location unit 320 of FIG. 3, the second location unit 352 of FIG. 3, or a combination thereof corresponding to the one or more instances of the user electronic device 102.

The location module 412 can further calculate the device location 138 based on signal strength from each corresponding instance of the user electronic device 102. The location module 412 can further calculate the device location 138 based on interference information associated with other proximate devices. The process for determining other devices and interference signals thereof is described in detail below.

The location module 412 can generate the device-location profile 228 of FIG. 2 based on multiple instances of the device location 138. The location module 412 can generate the device-location profile 228 including identification for each of the multiple instances of the user electronic device 102 with corresponding instance of the device location 138.

The location module 412 can use the first device interface 317 of FIG. 3, the second device interface 337 of FIG. 3, or a combination thereof corresponding to the user electronic device 102, the access node 106, an appropriate instance thereof, or a combination thereof to communicate the device location 138. The location module 412 can further use the first communication unit 316 of FIG. 3, the second communication unit 336 of FIG. 3, the first control unit 312 of FIG. 3, the second control unit 334 of FIG. 3, or a combination thereof corresponding to the user electronic device 102, the access node 106, an appropriate instance thereof, or a combination thereof to calculate the device location 138.

The location module 412 can use the can further use the first communication unit 316, the second communication unit 336, the first control unit 312, the second control unit 334, or a combination thereof corresponding to the user electronic device 102, the access node 106, an appropriate instance thereof, or a combination thereof to generate the device-location profile 228.

The location module 412 can store the device location 138, the device-location profile 228, or a combination thereof in the first communication unit 316, the second communication unit 336, the first storage unit 314 of FIG. 3, the second storage unit 346 of FIG. 3, or a combination thereof corresponding to the user electronic device 102, the access node 106, an appropriate instance thereof, or a combination thereof.

The linking module 414 is configured to establish communication between devices. The linking module 414 can establish the node-relaying communication 216, the direct-link communication 220, or a combination thereof. The linking module 414 can establish communication based on determining and communicating information regarding the linking mechanism 128.

For example, the linking module 414 can establish the node-relaying communication 216 based on determining the linking mechanism 128 for a paring of the user electronic device 102 and the access node 106. The linking module 414 can communicate to or notify the corresponding paring of the user electronic device 102 and the access node 106 the serving interface 130 of FIG. 1 to establish the communication. The grouped devices can use the linking mechanism 128 established by the linking module 414 to communicate the serving signal 108 of FIG. 1 including the serving content 110 of FIG. 1.

Also for example, the linking module 414 can establish the direct-link communication 220 for directly communicating between instances of the user electronic device 102 without communicating through the access node 106. The linking module 414 can establish the direct-link communication 220 by determining the linking mechanism 128 specific for the direct-link communication 220, communicating the direct-link initiation 226 of FIG. 2, information regarding the linking mechanism 128, or a combination thereof.

As a more specific example, the linking module 414 can include the user electronic device 102 transmitting the direct-link initiation 226 to request the direct-link communication 220 with a different instance of the user electronic device 102, such as between the first user device 202 and the second user device 204 as exemplified in FIG. 2. The linking module 414 can include corresponding instance of the access node 106 approving or rejecting the request. The linking module 414 can further include the access node 106 designating and communicating the serving interface 130 to the requesting instance of the user electronic device 102.

Also as a more specific example, the linking module 414 can include the access node 106 transmitting the direct-link initiation 226 to request or command the direct-link communication 220 between instances of the user electronic device 102, such as between the first user device 202 and the second user device 204. The linking module 414 can include the access node 106 designating and communicating the serving interface 130 to the designated instance of the user electronic device 102, communication counterpart thereto, or a combination thereof.

The instances of the user electronic device 102, such as between the first user device 202 and the second user device 204, can communicate according to the linking mechanism 128 designated by the access node 106 for the direct-link communication 220. For example, the first user device 202 and the second user device 204 can transmit and receive the inter-device signal 222 of FIG. 2 as the serving signal 108 for communicating the serving content 110 according to the linking mechanism 128 described by the serving interface 130 assigned by the access node 106.

The linking module 414 can interact with the location module 412. The linking module 414 can establish connection based on the device location 138. The location module 412 can track or update the device location 138 based on a type of communication. The linking module 414 can further manage the communications based on tracking and updating the device location 138.

For example, the interaction module 402 can receive the device location 138 locating the first user device 202, as the reference device, including the interference-aware receiver 124 of FIG. 1. The first user device 202 can initiate with the direct-link initiation 226, and the access node 106 can receive and approve the direct-link initiation 226, assign the linking mechanism 128, or a combination thereof based on the device location 138. The access node 106 can further initiate by transmitting the direct-link initiation 226, for representing the direct-link initiation 226 communicated to the first user device 202, and assign the linking mechanism 128 based on the device location 138.

The interaction module 402, the location module 412, the linking module 414, or a combination thereof can calculate a device separation measure 420 associated with the grouping of the user electronic devices 102 intended for the direct-link communication 220. The device separation measure 420 is a description of communication capabilities for the grouping of the user electronic devices 102 intended for the direct-link communication 220.

The device separation measure 420 can be associated with distance, channel condition, capabilities of the devices, or a combination thereof. The device separation measure 420 can be associated with ability to successfully transmit, receive, and recover the serving content 108 directly through the direct-link communication 220. The device separation measure 420 can be based on the device location 138 of the grouping of the user electronic devices 102 intended for the direct-link communication 220.

For example, the device separation measure 420 can include a distance between, calculated according to instances of the device location 138 corresponding to, the first user device 202 and the second user device 204 intending to communicate using direct-link communication 220. Also for example, the device separation measure 420 can include a channel condition, such as for signal fading or distortion, a signal strength or quality, or a combination thereof based on the device location 138 corresponding to the first user device 202, the second user device 204, or a combination thereof. The channel condition, the signal strength or quality, or a combination thereof can be based on channel information predetermined by the computing system 100 according to various locations.

The linking module 414 can establish the direct-link communication 220 based on comparing the device separation measure 420 to a direct-link threshold 422. The direct-link threshold 422 is a requirement for establishing the direct-link communication 220. The linking module 414 can include the direct-link threshold 422 predetermined by the computing system 100, communication standard, or a combination thereof.

The direct-link threshold 422 can include a requirement for proximity, signal strength, channel condition, resource condition for the UE or the base station, or a combination thereof. For example, the direct-link threshold 422 can represent a maximum distance between devices, projected movement or rate of movement for one or more of the UE, a minimum requirement for the direct-link channel 224 of FIG. 2, or a combination thereof.

The linking module 414 can establish the direct-link communication 220 when the device separation measure 420 satisfies the direct-link threshold 422. The linking module 414 can establish the direct-link communication 220 based on approving or responding positively to the direct-link initiation 226, determining and communicating the serving interface 130 designating the linking mechanism 128 for the direct-link communication 220, or a combination thereof.

The location module 412 can track and locate the instances of the user electronic equipment 102 utilizing the direct-link communication 220. The location module 412 can generate and maintain the device-location profile 228 including the device location 138 of the user electronic device 102 communicating through the direct-link communication 220.

The linking module 414 can use the first communication unit 316, the second communication unit 336, the first control unit 312, the second control unit 334, or a combination thereof corresponding to the user electronic device 102, the access node 106, an appropriate instance thereof, or a combination thereof to establish the communication between devices. The linking module 414 can store the details regarding the communication, such as the serving interface 130 or identification of the user electronic device 102 and corresponding communication mode or type in the first communication unit 316, the second communication unit 336, the first storage unit 314, the second storage unit 346, or a combination thereof corresponding to the user electronic device 102, the access node 106, an appropriate instance thereof, or a combination thereof.

The interference description module 416 is configured to determine information regarding the interference signal 120 of FIG. 1. The interference description module 416 can determine the information regarding the interference signal 120 from the perspective of the receiving device.

For example, the interference description module 416 can measure or process the receiver signal 116 of FIG. 1 for the information describing the interference signal 120, including the comprehensive signal measure 126 of FIG. 1. As a more specific example, the interference description module 416 can include the user electronic device 102 processing the receiver signal 116 to measure or calculate the comprehensive signal measure 126. The interference description module 416 can calculate the comprehensive signal measure 126 based on a method or a process predetermined by the computing system 100, communication standard, or a combination thereof.

Also for example, the interference description module 416 can communicate the information describing the interference signal 120 using the receiver processing parameter 136 of FIG. 1. As a more specific example, the interference description module 416 can include the user electronic device 102 transmitting the receiver processing parameter 136 and the access node 106 corresponding thereto receiving the receiver processing parameter 136 describing the interference signal 120.

The interference description module 416 can use the first communication unit 316, the second communication unit 336, the first control unit 312, the second control unit 334, or a combination thereof corresponding to the user electronic device 102, the access node 106, an appropriate instance thereof, or a combination thereof to determine the information regarding the interference signal 120. The interference description module 416 can store the information regarding the interference signal 120 in the first communication unit 316, the second communication unit 336, the first storage unit 314, the second storage unit 346, or a combination thereof corresponding to the user electronic device 102, the access node 106, an appropriate instance thereof, or a combination thereof.

After or while establishing, managing, or a combination of processes thereof for communications between devices, the control flow can pass to the interference detail module 404. The control flow can pass through a variety of ways. For example, control flow can pass by having processing results of one module passed to another module, such as by passing the serving interface 130, the receiver processing parameter 136, the comprehensive signal measure 126, or a combination thereof from the interaction module 402 to the interference detail module 404, by storing the processing results at a location known and accessible to the other module, such as by storing the serving interface 130, the receiver processing parameter 136, the comprehensive signal measure 126, or a combination thereof at a storage location known and accessible to the interference detail module 404, by notifying the other module, such as by using a flag, an interrupt, a status signal, or a combination for the interference detail module 404, or a combination of processes thereof.

The interference detail module 404 is configured to identify detail information associated with or describing the interference. The interference detail module 404 can identify detail information by determining the relevant interference source 118 of FIG. 1. For example, the interference detail module 404 can determine the relevant interference source 118 for identifying the second user device 204, the third user device 206, the first node device 208, the second node device 210, or a combination thereof interfering with the first user device 202 by transmitting the interference signal 120.

The interference detail module 404 can determine the relevant interference source 118 for variety of situations. For example, the interference detail module 404 can determine the relevant interference source 118 for the first user device 202 communicating through the direct-link communication 220 or the node-relaying communication 216. Also for example, the interference detail module 404 can determine the relevant interference source 118 for identifying a device interfering with the first user device 202 and communicating through the direct-link communication 220 or the node-relaying communication 216.

As a more specific example, the interference detail module 404 can determine the relevant interference source 118 for identifying the user electronic device 102 transmitting the interference signal 120 to the access node 106 for the node-relaying communication 216. Also as a more specific example, the interference detail module 404 can determine the relevant interference source 118 for identifying the third user device 206 transmitting the interference signal 120 to the second user device 204 for the direct-link communication 220 and interfering with the first user device 202.

The interference detail module 404 can determine the relevant interference source 118 based on the device location 138. The interference detail module 404 can determine the relevant interference source 118 based on the device location 138 for locating the user electronic device 102 including the interference-aware receiver 124.

For example, the interference detail module 404 can determine the relevant interference source 118 based on the device location 138 corresponding to the first user device 202, the second user device 204, the third user device 206, or a combination thereof. Also for example, the interference detail module 404 can determine the relevant interference source 118 based on device-location profile 228 including one or more instances of the device location 138, the device separation measure 420, or a combination thereof.

As a more specific example, the interference detail module 404 can determine based on the device location 138 for locating the first user device 202 including the interference-aware receiver 124 for processing the receiver signal 116 including the serving signal 108 and the interference signal 120. The relevant interference source 118 can identify the third user device 206 transmitting the interference signal 120 described by the interfering interface 132 of FIG. 1 and received at the first user device 202.

The interference detail module 404 can determine the relevant interference source 118 in a variety of ways. For example, the interference detail module 404 can determine the relevant interference source 118 based on physical separation between devices, signal strengths perceived at one or more devices, types of transmitting devices or communication modes, or a combination thereof. As a more specific example, the interference detail module 404 can determine the relevant interference source 118 based the device separation measure 420, an interference nodal-threshold 424, an interference direct-threshold 426, or a combination thereof.

The interference nodal-threshold 424 is a limitation or a requirement for identifying or considering an instance of the user electronic device 102 transmitting to the access node 106 as interfering with a receiving device. For example, the interference nodal-threshold 424 can include the limitation or the requirement for identifying or considering the third user device 206 utilizing the node-relaying communication 216 to transmit as corresponding to the relevant interference source 118 transmitting the interference signal 120 received at the first user device 202.

As a more specific example, the interference nodal-threshold 424 can include the limitation or the requirement for signal strengths perceived at the first user device 202, the third user device 206, the access node 106, or a combination thereof, distance between the first user device 202 and the third user device 206, device type or identification, relative locations to the access node 106, or a combination thereof. The interference detail module 404 can determine the relevant interference source 118 based on the device separation measure 420 between the first user device 202 and the third user device 206 as a candidate device satisfying the interference nodal-threshold 424.

The interference direct-threshold 426 is a limitation or a requirement for identifying or considering an instance of the user electronic device 102 transmitting to a further instance of the user electronic device 102 as interfering with a receiving device. For example, the interference direct-threshold 426 can include the limitation or the requirement for identifying or considering the third user device 206 utilizing the direct-link communication 220 to transmit as corresponding to the relevant interference source 118 transmitting the interference signal 120 received at the first user device 202.

As a more specific example, the interference direct-threshold 426 can include the limitation or the requirement for signal strengths perceived at the first user device 202, the second user device 204, the third user device 206, the access node 106, or a combination thereof, distance between any pair of devices, device type or identification, relative locations to the access node 106, or a combination thereof. The interference detail module 404 can determine the relevant interference source 118 based on the device separation measure 420 between the first user device 202 and the third user device 206 as the candidate device satisfying the interference direct-threshold 426.

The interference detail module 404 can select or identify the reference device for providing interference information. The interference detail module 404 can process the interference from the perspective of the reference device. For example, the reference device can be the first user device 202.

The interference detail module 404 can determine the relevant interference source 118 based on selecting or identifying a candidate device meeting conditions or requirements predetermined by the computing system 100. The interference detail module 404 can process the candidate device as one or more potential instances of the relevant interference source 118.

The interference detail module 404 can process or consider one or more instances of the user electronic device 102 in the device-location profile 228 as the candidate device. For example, the candidate devices can include the user electronic device 102 other than the first user device 202, such as the second user device 204, the third user device 206, or a combination thereof.

The interference detail module 404 can calculate or access the device separation measure 420 between the reference device and the candidate device using the device-location profile 228. The interference detail module 404 can compare and analyze the resulting instance of the device separation measure 420, the serving interface 130 for the candidate device, the device location 138 of the reference device relative to the first node device 208 or the second node device 210, or a combination thereof to the interference nodal-threshold 424, the interference direct-threshold 426, or a combination thereof.

The interference detail module 404 can determine the relevant interference source 118 as the candidate device including the device separation measure 420, the various conditions described above, or a combination thereof satisfying the predetermined conditions or requirements, such as the interference nodal-threshold 424, the interference direct-threshold 426, or a combination thereof. For example, the interference detail module 404 can determine the relevant interference source 118 for representing the candidate device, such as the second user device 204 or the third device 206, closest to the reference device, such as the first user device 202, satisfying the predetermined conditions or requirements, or a combination thereof.

The interference detail module 404 can determine the relevant interference source 118 as the signal source that is or most likely transmitting the interference signal 120. The interference detail module 404 can consider the various conditions, such as the device separation measure 420, the serving interface 130 for the candidate device, the device location 138 of the reference device relative to the first node device 208 or the second node device 210, or a combination thereof for identifying between an instance of the user electronic device 102 or an instance of the access node 106 transmitting the interference signal 120.

For example, the interference detail module 404 can determine the relevant interference source 118 based on considering a power difference in transmitted signals between the user electronic device 102 and the access node 106. Also for example, the interference detail module 404 can determine the relevant interference source 118 transmitting the uplink signal 112 of FIG. 1, the downlink signal 114 of FIG. 1, the inter-device signal 222, or a combination thereof. Also for example, the interference detail module 404 can determine the relevant interference source 118 for the reference device communicating through the direct-link communication 220, the node-relaying communication 216, or a combination thereof.

The interference detail module 404 can identify the linking mechanism 128 utilized by the device represented by the relevant interference source 118. The interference detail module 404 can identify the linking mechanism 128 based on identifying the serving interface 130 corresponding to the relevant interference source 118 utilized for communicating with a device other than the reference device.

The interference detail module 404 can determine the interfering interface 132 for the reference device as the serving interface 130 corresponding to the relevant interference source 118. The interference detail module 404 can determine the interfering interface 132 associated with the relevant interference source 118 for describing the interference signal 120 from the relevant interference source 118 and received at the reference device through the receiver signal 116 of FIG. 1.

It has been discovered that the relevant interference source 118 and corresponding instance of the interfering interface 132 based on the device location 138 provides flexibility in processing interferences for various combinations of communication modes. The computing system 100 can consider and process for the user electronic device 102 as potential transmitting source of the interference signal 120 based on the device location 138. The computing system 100 can further consider interference in various communication scenarios for the node-relaying communication 216, the direct-link communication 220, or a combination thereof for the reference device, the interfering device, or a combination thereof based on considering and processing for the user electronic device 102 along with the access node 106 as potential interfering devices.

It has been discovered that the relevant interference source 118 identifying the user electronic device 102 transmitting the interference signal 120 according to the direct-link communication 220 provides increased throughput and increased capacity for each cell while maintaining performance of cellular UE. It has further been discovered that the relevant interference source 118 identifying the user electronic device 102 transmitting the interference signal 120 according to the node-relaying communication 216 provides increased throughput and increased capacity for each cell while maintaining performance of cellular UE.

It has further been discovered that the relevant interference source 118 identifying the interfering interface 132 for recovering the serving content 110 communicated through the direct-link communication 220 provides increased throughput and increased capacity for each cell while maintaining performance of cellular UE. It has further been discovered that the relevant interference source 118 identifying the interfering interface 132 for recovering the serving content 110 communicated through the node-relaying communication 216 provides increased throughput and increased capacity for each cell while maintaining performance of cellular UE.

The computing system 100 can use the relevant interference source 118 and the corresponding instance of the interfering interface 132 for accommodating the direct-link communication 220 within in the cell. The relevant interference source 118 and the interfering interface 132 can increase throughput and reliability for each of the communications by accurately processing the interference. The increase in throughput and reliability can lower the burden and resource consumption for the access node 106, which can then use the relief in burden and resources to accommodate more communications, such as utilizing more of the direct-link communication 220.

The interference detail module 404 can use the first communication unit 316, the second communication unit 336, the first control unit 312, the second control unit 334, or a combination thereof corresponding to the user electronic device 102, the access node 106, an appropriate instance thereof, or a combination thereof to determine the relevant interference source 118, the interfering interface 132, or a combination thereof. The interference detail module 404 can store the relevant interference source 118, the interfering interface 132, or a combination thereof for the reference device in the first communication unit 316, the second communication unit 336, the first storage unit 314, the second storage unit 346, or a combination thereof corresponding to the user electronic device 102, the access node 106, an appropriate instance thereof, or a combination thereof.

After identify details associated with or describing the interference, the control flow can pass to the content processing module 406. The control flow can pass similarly as described above between the interaction module 402 and the interference detail module 404 but using processing results of the interference detail module 404, such as the relevant interference source 118, the interfering interface 132, or a combination thereof.

The content processing module 406 is configured to process for the interference for eliminating the interference and recover the desired content. The content processing module 406 can process for the interference by communicating the interfering interface 132, recovering or recognizing the interference content 122 of FIG. 1 from the receiver signal 116 using the interfering interface 132, using the interference content 122 to recover or recognize the serving content 110, or a combination thereof.

The content processing module 406 communicate the interfering interface 132 to the interference-aware receiver 124 for processing the interference signal 120 or a further instance thereof. For example, the content processing module 406 can use the first device interface 317, the second device interface 337, or a combination thereof corresponding to the user electronic device 102, the access node 106, an appropriate instance thereof, or a combination thereof to transmit, receive, or a combination thereof for the interfering interface 132.

As a more specific example, the content processing module 406 can transmit the interfering interface 132 from the access node 106 to and received by the serving instance of the user electronic device 102 including the interference-aware receiver 124 as the reference device. Also as a more specific example, the content processing module 406 can transmit the interfering interface 132 for recognizing the interference content 122, the interference signal 120, or a combination thereof in the receiver signal 116 for targeting the serving signal 108 with the interference-aware receiver 124.

Also as a more specific example, the content processing module 406 can transmit the interfering interface 132 for targeting the inter-device signal 222 as the serving signal 108 from the second user device 204. The inter-device signal 222 can be included in the receiver signal 116 for the direct-link communication 220 with the reference device along with the interference signal 120. The serving content 110 from the inter-device signal 222 can be targeted and processed using the interference-aware receiver 124.

Also as a more specific example, the content processing module 406 can transmit the interfering interface 132 for targeting the downlink signal 114 from the serving instance of the access node 106 as the serving signal 108. The downlink signal 114 can be included in the receiver signal 116 for the node-relaying communication 216 with the reference device along with the interference signal 120. The serving content 110 from the downlink signal 114 can be targeted and processed using the interference-aware receiver 124.

Also as a more specific example, the content processing module 406 can transmit the interfering interface 132 for targeting the serving content 110 by recognizing the uplink signal 112, the inter-device signal 222, or a combination thereof as the interference signal 120, the interference content 122 therein, or a combination thereof. The interference content 122, the interference signal 120, or a combination thereof can be targeted and processed using the interference-aware receiver 124. The interference content 122 the interference signal 120, or a combination thereof can be used to further target and process for the serving content 110.

The content processing module 406 can target and process information by using the interference-aware receiver 124 to detect, decode, interleave, error detect, error correct, or a combination thereof for specific content. The content processing module 406 can use the interference-aware receiver 124 to identify, target, and process specifically for the serving signal 108, the interference signal 120, or a combination thereof for the receiver signal 116 at the reference device.

The content processing module 406 can also use the interference-aware receiver 124 to detect, decode, interleave, error detect, error correct, or a combination thereof specifically for the interference content 122 from an interfering instance of the user electronic device 102 included in the receiver signal 116. The content processing module 406 can use the interference-aware receiver 124 to eliminate or cancel the interference signal 120 or the interference content 122 from the receiver signal 116 or for targeting and processing for the serving content 110.

It has been discovered that the relevant interference source 118 based on the device location 138 for the interference-aware receiver 124 provides decrease in decoding errors. It has further been discovered that the interfering interface 132 based on the device location 138 for the interference-aware receiver 124 provides decrease in decoding errors. The computing system 100 can accurately identify or estimate the source of the interference signal 120 by considering the device location 138 of the reference device and the candidate device. The relevant interference source 118 can be the result of identifying or estimating the source of the interference signal 120. The interfering interface 132 corresponding to the relevant interference source 118 can accurately describe the interference signal 120, which can be used by the reference device to decode the receiver signal 116.

It has further been discovered that the relevant interference source 118 based on the device separation measure 420 and the interference nodal-threshold 424 provides increase in total system throughput for the computing system 100. It has further been discovered that the relevant interference source 118 based on the device separation measure 420 and the interference direct-threshold 426 provides increase in total system throughput for the computing system 100. The computing system 100 can use the interference nodal-threshold 424, the interference direct-threshold 426, or a combination thereof to distinguish between the access node 106 and the user electronic device 102 as the source of the interference signal 120. The distinction can be used to accurately identify the interfering interface 132 corresponding to the interference signal 120 perceived by the reference device.

The content processing module 406 can use the first inter-device interface 317, the second inter-device interface 337, the first communication unit 316, the second communication unit 336, the first control unit 312, the second control unit 334, or a combination thereof corresponding to the user electronic device 102, the access node 106, an appropriate instance thereof, or a combination thereof to process for the interference and the desired content. The content processing module 406 can store the processing results in the first communication unit 316, the second communication unit 336, the first storage unit 314, the second storage unit 346, or a combination thereof corresponding to the user electronic device 102, the access node 106, an appropriate instance thereof, or a combination thereof.

After processing for the serving content 110, the control flow can pass back to the interaction module 402. The user electronic device 102 can report processing results, such as information regarding channel, decoding success or failure, interference signal detail, or a combination thereof back to the serving instance of the access node 106. The interaction module 402 can modify or update locations, communication modes, interference descriptions, or a combination thereof based on the feedback report.

Figure 5:
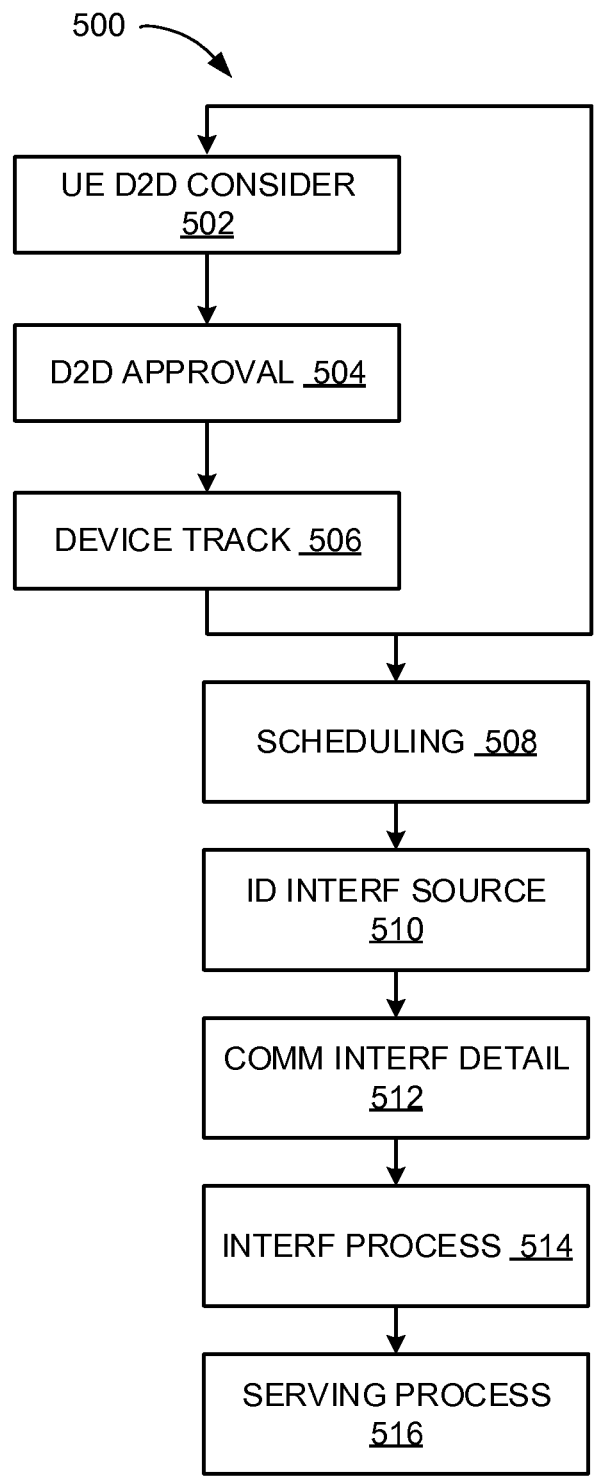
FIG. 5 is an exemplary operational flowchart of the computing system of FIG. 1.

Referring now to FIG. 5, therein is shown an exemplary operational flowchart 500 of the computing system 100 of FIG. 1. The exemplary operational flowchart 500 can illustrate a specific example for the user electronic device 102 of FIG. 1 initiating the direct-link communication 220 of FIG. 2. The exemplary operational flowchart 500 can further illustrate a further specific example for the computing system 100 processing the interference signal 120 of FIG. 1 from the user electronic device 102.

The exemplary operational flowchart 500 can include UE device-to-device consideration in a box 502. The UE device-to-device consideration can represent the user electronic device 102 initiating the direct-link communication 220. The box 502 can include the first user device 202 of FIG. 2 transmitting the direct-link initiation 226 of FIG. 2 to the access node 106 of FIG. 1 for directly communicating with the second user device 204 of FIG. 2. The computing system 100 can implement the process represented by the box 502 using the interaction module 402 of FIG. 4. Details regarding the interaction module 402 have been described above.

The exemplary operational flowchart 500 can include device-to-device approval in a box 504. The device-to-device approval can represent the access node 106 considering and approving the direct-link communication 220 between instances of the user electronic device 102. The box 504 can further represent the access node 106 communicating the serving interface 130 of FIG. 1 to the user electronic device 102 requesting the direct-link communication 220. The computing system 100 can implement the device-to-device approval using the interaction module 402. Details regarding the interaction module 402 have been described above.

The exemplary operational flowchart 500 can include device tracking in a box 506. The device tracking can represent the access node 106 further locating and communicating with the user electronic device 102 utilizing the direct-link communication 220. The box 506 can represent communication of the device location 138 of FIG. 1, channel information, interference information, or a combination thereof after establishing the direct-link communication 220. The computing system 100 can implement the box 506 using the interaction module 402. Details regarding the interaction module 402 have been described above. The computing system 100 can repeat the processes represented by the boxes 502-506 for establishing multiple instances of the direct-link communication 220.

The exemplary operational flowchart 500 can include scheduling in a box 508. The computing system 100 can include one or more instances of the access node 106 scheduling various communications, including the direct-link communication 220, the node-relaying communication 216 of FIG. 2, or a combination thereof. The computing system 100 can schedule by arranging or managing simultaneous communications to multiple instances of the user electronic device 102 utilizing the direct-link communication 220, the node-relaying communication 216, or a combination thereof.

The exemplary operational flowchart 500 can include identification of interference source in a box 510. The identification of interference source can represent the computing system 100 determining the relevant interference source 118 of FIG. 1, the interfering interface 132 of FIG. 1, or a combination thereof for the reference device. The box 510 can represent the computing system 100, including the access node 106 or the user electronic device 102, determining the UE nearest to the reference device utilizing the direct-link communication 220, the node-relaying communication 216, or a combination thereof as the relevant interference source 118.

The box 510 can be implemented using the interference detail module 404 of FIG. 4. Details regarding the interference detail module 404 have been described above.

The exemplary operational flowchart 500 can include communication of interference detail in a box 512. The communication of interference detail can represent the access node 106 transmitting the interfering interface 132 to the reference device. The box 512 can be implemented using the content processing module 406 of FIG. 4. Details regarding the content processing module 406 have been described above.

The exemplary operational flowchart 500 can include interference processing in a box 514. The interference processing can represent the user electronic device 102 including the interference-aware receiver 124 of FIG. 1 targeting, recognizing, or a combination thereof for the interference signal 120, the interference content 122 of FIG. 1, or a combination thereof in the receiver signal 116 of FIG. 1 using the interfering interface 132.

The box 514 can represent the user electronic device 102 decoding, detecting, or a combination thereof for the interference signal 120 with the interfering interface 132 provided from the access node 106. The box 514 can be implemented using the content processing module 406. Details regarding the content processing module 406 have been described above.

The exemplary operational flowchart 500 can include serving processing in a box 516. The serving processing can represent the user electronic device 102 including the interference-aware receiver 124 targeting, recognizing, or a combination thereof for the serving signal 108 of FIG. 1, the serving content 110 of FIG. 1, or a combination thereof in the receiver signal 116 using the interference information.

The box 516 can represent the user electronic device 102 mitigating or cancelling the interference based on result of the process represented by the box 514. The box 516 can be implemented using the content processing module 406. Details regarding the content processing module 406 have been described above.

Figure 6:
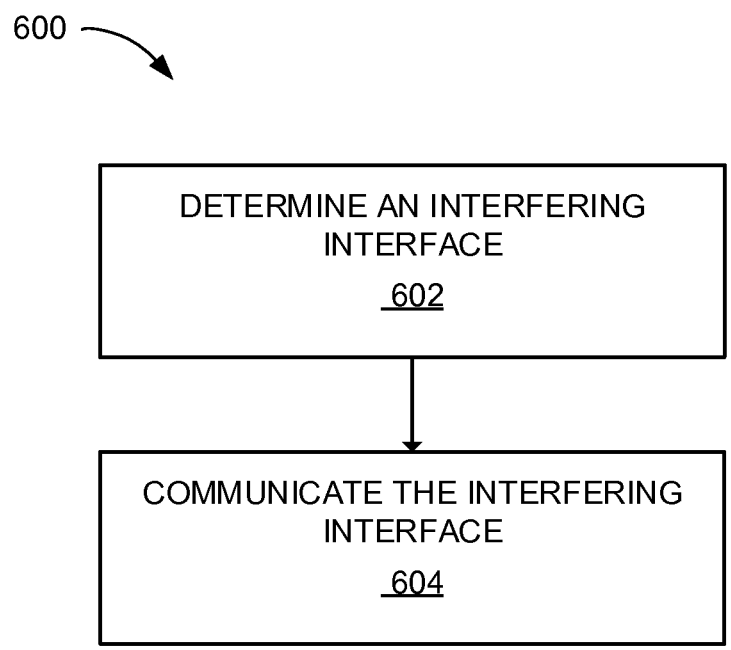
FIG. 6 is a flow chart of a method of operation of a computing system in a further embodiment of the present invention.

Referring now to FIG. 6, therein is shown a flow chart 600 of a method of operation of a computing system in a further embodiment of the present invention. The method 600 includes: determining an interfering interface based on a device location for locating an interference-aware receiver for processing a receiver signal including an interference signal described by the interfering interface in a block 602; and communicating the interfering interface for communicating the interfering interface to the interference-aware receiver for processing the interference signal or a further instance thereof in a block 604.

The modules described in this application can be hardware implementation or hardware accelerators, including passive circuitry, active circuitry, or both, in the first communication unit 316 of FIG. 3, the second communication unit 336 of FIG. 3, the first control unit 312 of FIG. 3, the second control unit 338 of FIG. 3, or a combination thereof corresponding to the user electronic device 102 of FIG. 1, the access node 106 of FIG. 1, an appropriate instance thereof, or a combination thereof. The modules can also be hardware implementation or hardware accelerators, including passive circuitry, active circuitry, or both, within one or more instances of the first electronic device 102, the access node 106, or a combination thereof but outside of the first communication unit 316, the second communication unit 336, the first control unit 312, the second control unit 334, or a combination thereof.

The computing system 100 of FIG. 1 has been described with module functions or order as an example. The computing system 100 can partition the modules differently or order the modules differently. For example, the interference description module 416 of FIG. 4 and the interference detail module 404 of FIG. 4 can be combined and implemented in one module. Also for example, the functions for establishing the direct-link communication 220 of FIG. 2 and the node-relaying communication 216 of FIG. 2 can be separated into different modules.

For illustrative purposes, the various modules have been described as being specific to the first electronic device 102, the access node 106, or a combination thereof. However, it is understood that the modules can be distributed differently. For example, the various modules can be implemented in a different device, or the functionalities of the modules can be distributed across multiple devices. Also as an example, the various modules can be stored in a non-transitory memory medium.

As a more specific example, one or more modules described above can be stored in the non-transitory memory medium for distribution to a different system, a different device, a different user, or a combination thereof, for manufacturing, or a combination thereof. Also as a more specific example, the modules described above can be implemented or stored using a single hardware unit, such as a chip or a processor, or across multiple hardware units.

The modules described in this application can be stored in the non-transitory computer readable medium. The first communication unit 316, the second communication unit 336, the first control unit 312, the second control unit 334, or a combination thereof can represent the non-transitory computer readable medium. The first communication unit 316, the second communication unit 336, the first control unit 312, the second control unit 334, a portion therein, or a combination thereof can be removable from the user electronic device 102, the access node 106, or a combination thereof. Examples of the non-transitory computer readable medium can be a non-volatile memory card or stick, an external hard disk drive, a tape cassette, or an optical disk.

The physical transformation of the receiver signal 116 of FIG. 1 including the interference signal 120 of FIG. 1 along with the serving content 110 of FIG. 1 results in the movement in the physical world, such as content displayed or recreated for the user on the first user device from processing the serving content therein. The content reproduced on the user electronic device 102, such as navigation information or voice signal of a caller, can influence the user's movement, such as following the navigation information or replying back to the caller. Movement in the physical world results in changes to the channel measures, the geographic location of the user electronic device 102, such as for the device location 138 of FIG. 1, interfering transmissions, or a combination thereof, which can be fed back into the computing system 100 and influence the interfering interface 132 of FIG. 1.

The resulting method, process, apparatus, device, product, and/or system is straightforward, cost-effective, uncomplicated, highly versatile, accurate, sensitive, and effective, and can be implemented by adapting known components for ready, efficient, and economical manufacturing, application, and utilization. Another important aspect of an embodiment of the present invention is that it valuably supports and services the historical trend of reducing costs, simplifying systems, and increasing performance.

These and other valuable aspects of an embodiment of the present invention consequently further the state of the technology to at least the next level.

While the invention has been described in conjunction with a specific best mode, it is to be understood that many alternatives, modifications, and variations will be apparent to those skilled in the art in light of the aforegoing description. Accordingly, it is intended to embrace all such alternatives, modifications, and variations that fall within the scope of the included claims. All matters set forth herein or shown in the accompanying drawings are to be interpreted in an illustrative and non-limiting sense.

What is claimed is:

1. A computing system comprising:
 a communication unit configured to:
  compare a device separation measure to a direct-link threshold, wherein the device separation measure is calculated from a device location for locating a reference user device, and wherein the direct-link threshold represents a maximum distance and one or more of a projected movement and a rate of movement between the reference user device and a further user device to establish a direct-link communication for directly communicating between the reference user device and the further user device;
  determine an interfering interface based on the device separation measure wherein:
   the interfering interface is for representing one or more specific control parameters of an interference signal transmitted by an interfering device;
   the reference user device is configured to receive a receiver signal intended for communication with an intended device, wherein the reference user device is configured to decode the interference signal within the receiver signal using the one or more specific control parameters;
   the device separation measure is for representing communication capabilities associated with distance between the reference user device and the interfering device; and
 an inter-device interface, coupled with the communication unit, configured to communicate the interfering interface for communicating the interfering interface to the reference user device.

2. The system as claimed in claim 1 wherein the communication unit is configured to determine a relevant interference source for identifying the interfering device transmitting the interference signal to the further user device.

3. The system as claimed in claim 1 wherein the inter-device interface is configured to transmit the interfering interface for targeting an inter-device signal from the further user device included in the receiver signal along with the interference signal using an interference-aware receiver.

4. The system as claimed in claim 1 wherein the inter-device interface is configured to transmit the interfering interface for targeting a downlink signal from the inter-device interface included in the receiver signal along with the interference signal using an interference-aware receiver.

5. The system as claimed in claim 1 wherein the inter-device interface is configured to:
 receive the device location for locating the reference user device including an interference-aware receiver; and
 transmit the interfering interface for recognizing an interference content from the interference signal in targeting a serving signal with the interference-aware receiver.

6. The system as claimed in claim 5 wherein the communication unit is configured to establish the direct-link communication for directly communicating between the reference user device and the further user device without communicating through an access node.

7. The system as claimed in claim 5 wherein the inter-device interface is configured to receive a direct-link initiation for representing the direct-link initiation from the reference user device.

8. The system as claimed in claim 5 wherein the inter-device interface is configured to transmit a direct-link initiation for representing the direct-link initiation communicated to the reference user device.

9. The system as claimed in claim 5 wherein the communication unit is configured to determine a relevant interference source for representing a candidate user device closest to the reference user device, satisfying an interference nodal-threshold, satisfying an interference direct-threshold, or a combination thereof.

10. The system as claimed in claim 1 wherein the communication unit is configured to determine a relevant interference source for identifying the interfering device transmitting the interference signal to an access node.

11. A method of operation of a computing system comprising:
 comparing a device separation measure to a direct-link threshold, wherein the device separation measure is calculated from a device location for locating a reference user device, and wherein the direct-link threshold represents a maximum distance and one or more of a projected movement and a rate of movement between the reference user device and a further user device to establish a direct-link communication for directly communicating between the reference user device and the further user device,
 determining an interfering interface based on the device separation measure wherein:
  the interfering interface is for representing one or more specific control parameters of an interference signal transmitted by an interfering device;
  the reference user device is configured to receive a receiver signal intended for communication with an intended device, wherein the reference user device is configured to decode the interference signal within the receiver signal using the one or more specific control parameters;

the device separation measure is for representing communication capabilities associated with distance between the reference user device and the interfering device; and communicating the interfering interface for communicating the interfering interface to the reference user device.

12. The method as claimed in claim 11 further comprising determining a relevant interference source for identifying the interfering device transmitting the interference signal to the further user device.

13. The method as claimed in claim 11 wherein communicating the interfering interface includes transmitting the interfering interface for targeting an inter-device signal from the further user device included in the receiver signal along with the interference signal using an interference-aware receiver.

14. The method as claimed in claim 11 wherein communicating the interfering interface includes transmitting the interfering interface for targeting a downlink signal from the inter-device interface included in the receiver signal along with the interference signal using an interference-aware receiver.

15. The method as claimed in claim 11 further comprising determining a relevant interference source for identifying the interfering device transmitting the interference signal to an access node.

16. A non-transitory computer readable medium including instructions for a computing system comprising:

comparing a device separation measure to a direct-link threshold, wherein the device separation measure is calculated from a device location for locating a reference user device, and wherein the direct-link threshold represents a maximum distance and one or more of a projected movement and a rate of movement between the reference user device and a further user device to establish a direct-link communication for directly communicating between the reference user device and the further user device;

determining an interfering interface based on the device separation measure wherein:

the interfering interface is for representing one or more specific control parameters of an interference signal transmitted by an interfering device;

the reference user device is configured to receive a receiver signal intended for communication with an intended device, wherein the reference user device is configured to decode the interference signal within the receiver signal using the one or more specific control parameters;

the device separation measure is for representing communication capabilities associated with distance between the reference user device and the interfering device; and communicating the interfering interface for communicating the interfering interface to the first user device.

17. The non-transitory computer readable medium as claimed in claim 16 further comprising determining a relevant interference source for identifying the interfering device transmitting the interference signal to the further user device.

18. The non-transitory computer readable medium as claimed in claim 16 wherein communicating the interfering interface includes transmitting the interfering interface for targeting an inter-device signal from the further user device included in the receiver signal along with the interference signal using an interference-aware receiver.

19. The non-transitory computer readable medium as claimed in claim 16 wherein communicating the interfering interface includes transmitting the interfering interface for targeting a downlink signal from the inter-device interface included in the receiver signal along with the interference signal using an interference-aware receiver.

20. The non-transitory computer readable medium as claimed in claim 16 further comprising determining a relevant interference source for identifying the interfering device transmitting the interference signal to an access node.

* * * * *